(12) United States Patent
Clark

(10) Patent No.: US 12,431,037 B2
(45) Date of Patent: Sep. 30, 2025

(54) DEVICES AND METHODS TO AID PROCESSING OF VISUAL INFORMATION

(71) Applicant: Helen Shan Clark, Ipswich (GB)

(72) Inventor: Helen Shan Clark, Ipswich (GB)

( * ) Notice: Subject to any disclaimer, the term of this patent is extended or adjusted under 35 U.S.C. 154(b) by 890 days.

(21) Appl. No.: 17/594,695

(22) PCT Filed: Apr. 29, 2020

(86) PCT No.: PCT/US2020/070010
§ 371 (c)(1),
(2) Date: Oct. 26, 2021

(87) PCT Pub. No.: WO2020/223743
PCT Pub. Date: Nov. 5, 2020

(65) Prior Publication Data
US 2022/0254271 A1      Aug. 11, 2022

Related U.S. Application Data

(60) Provisional application No. 62/841,152, filed on Apr. 30, 2019.

(51) Int. Cl.
| | |
|---|---|
| *G09B 17/04* | (2006.01) |
| *G02B 27/01* | (2006.01) |
| *G09B 17/02* | (2006.01) |
| *G09B 21/00* | (2006.01) |

(52) U.S. Cl.
CPC ......... *G09B 17/04* (2013.01); *G02B 27/0149* (2013.01); *G09B 17/02* (2013.01); *G09B 21/008* (2013.01); *G02B 2027/0178* (2013.01)

(58) Field of Classification Search
None
See application file for complete search history.

(56) References Cited

U.S. PATENT DOCUMENTS

| | | |
|---|---|---|
| 2,280,297 A | 4/1942 | Neumueller et al. |
| 2,837,086 A | 6/1958 | Thorburn |
| 4,379,699 A | 4/1983 | Nelson |
| 4,979,902 A | 12/1990 | Morelle et al. |

(Continued)

FOREIGN PATENT DOCUMENTS

| | | |
|---|---|---|
| CN | 201566333 U | 9/2010 |
| FR | 2942552 A1 | 8/2010 |

(Continued)

OTHER PUBLICATIONS

Turkeltaub PE et al., Nature Neuroscience "Development of neural mechanisms for reading" (Jul. 2003) abstract.

(Continued)

*Primary Examiner* — James B Hull

(57) ABSTRACT

Exemplary visual processing devices and methods are disclosed. Example devices may include a visual processing aid having at least one anchoring member (76) that is attached to a housing (74) such that the anchoring member is positioned proximal to a line of sight, between a retina of a user and a scene. The anchoring member has one or more straight-line sloping branches (80), to enable a user to assimilate visual information from left and right visual fields of one eye, and from both eyes, quickly and accurately and produce an image of a scene. Other devices and methods are described and shown.

12 Claims, 20 Drawing Sheets

(56) References Cited

U.S. PATENT DOCUMENTS

| | | | |
|---|---|---|---|
| 5,060,062 A | 10/1991 | Dotson | |
| 5,963,294 A | 10/1999 | Schiffer | |
| 6,352,345 B1 | 3/2002 | Zolten | |
| 6,832,915 B1 | 12/2004 | Kirby | |
| 7,565,759 B1 * | 7/2009 | Brennan | G09B 17/04 |
| | | | 116/235 |
| 8,070,492 B1 | 12/2011 | McKinnis | |
| 9,028,064 B2 | 5/2015 | Harris | |
| 10,242,588 B1 | 3/2019 | Thirupparangiri et al. | |
| 10,386,646 B1 | 8/2019 | Serdarevic et al. | |
| 2002/0146669 A1 * | 10/2002 | Bender | G09B 17/003 |
| | | | 434/178 |
| 2004/0248069 A1 | 12/2004 | Palacios | |
| 2008/0173232 A1 | 7/2008 | Smith | |
| 2016/0027321 A1 * | 1/2016 | Taylor | G09B 17/02 |
| | | | 434/180 |

FOREIGN PATENT DOCUMENTS

| | | |
|---|---|---|
| GB | 2393690 B | 4/2004 |
| GB | 2414438 B1 | 11/2005 |

OTHER PUBLICATIONS

Williams R, The Scientist "Symmetrical Eyes Indicate Dyslexia" (Oct. 2017)—entire article.

* cited by examiner

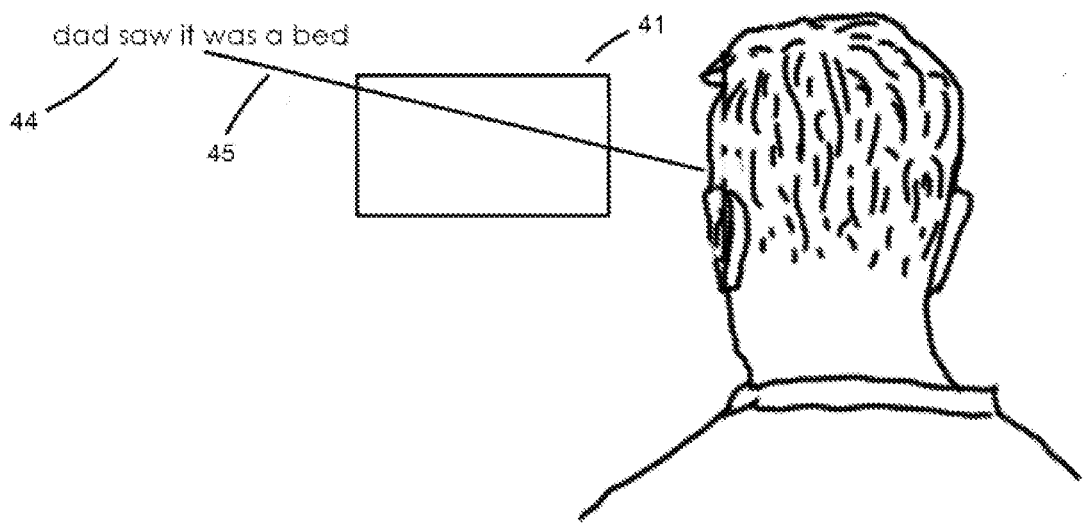
Fig. 2A (Prior Art)
Fig. 2B (Prior Art)
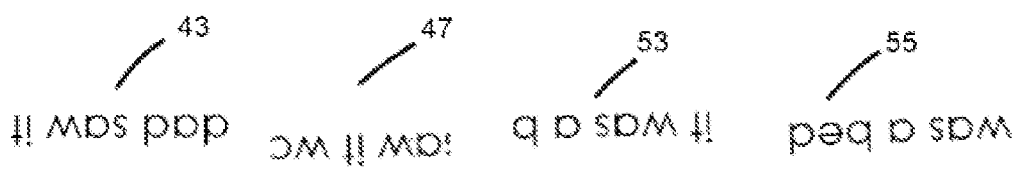
Fig. 2C (Prior Art)

DEVICES AND METHODS TO AID PROCESSING OF VISUAL INFORMATION

CROSS-REFERENCE TO RELATED APPLICATIONS

This application claims benefit of provisional patent application Ser. No. 62/841,152, filed 2019 Apr. 30 by the present inventor.

BACKGROUND

Prior Art

The following is a tabulation of some prior art that presently appears relevant:

U.S. Patents

| Pat. No. | Kind Code | Issue Date | Patentee |
|---|---|---|---|
| 4,979,902 | B2 | 1990 Dec. 25 | Morelle, et al. |
| 9,028,064 | B2 | 2015 May 12 | Harris |
| 10,242,588 | B2 | 2019 Mar. 26 | Thirupparangiri, et al. |
| 10,386,646 | B2 | 2019 Aug. 20 | Serdarevic, et al. |

U.S. Patent Application Publications

| Publication Nr. | Kind Code | Publication Date | Application |
|---|---|---|---|
| 5963294 | A | 1999 Oct. 5 | Schiffer |

Foreign Patent Documents

| Foreign Doc. Nr. | Cntry Code | Kind Code | Pub. Dt | App or Patentee |
|---|---|---|---|---|
| 2393690 | GB | B | 2004 Apr. 7 | Bruce |
| 2414438 | GB | B1 | 2005 Nov. 30 | Hext |
| 2942552 | FR | A1 | 2010 Aug. 27 | Danilo |

Nonpatent Literature Documents

Turkeltaub P E et al., Nature Neuroscience "Development of neural mechanisms for reading" (July 2003)

Williams R, The Scientist "Symmetrical Eyes Indicate Dyslexia" (October 2017)

Humans often use written words for communicating, and the impact of reading disability is profound. In 1877, German doctor Adolph Kussmaul first diagnosed "wordblindheit" or word blindness. A decade later, Rudolph Berlin, used the term dyslexia, from Greek prefix dus-, meaning difficult, and lexis, meaning speech or word. In 1917, James Hinshelwood, described letter reversals, and difficulties with spelling and reading comprehension. He saw that attempts to teach children by ordinary methods had failed. In 1937, Samuel T. Orton suggested a visionary theory. He thought dyslexia was caused by conflicting stores of visual information in the left and right brain hemispheres. Orton suggested reading be taught using both left and right brain functions. By the 1970s research focused on phonological deficit. Phonics and phonological awareness were taught. Basic resources and teaching methods introduced included flash cards, worksheets, dictionaries, word games and word lists. In the absence of any better solution, these approaches are currently used for reading intervention. They are time consuming and need intense adult intervention. Many students still fail to read.

In 2003 Peter Turkeltaub et al. used functional magnetic resonance imaging to study brain activity of children learning to read. Their findings supported Orton's theory of reading development. In 2017, Ruth Williams saw lack of a dominant eye and a symmetrical layout of rods and cones within the retinas of dyslexic people.

Modern prior art includes eye patches, eyeglasses that block peripheral vision, a reading aid, eye level reading rulers, vision therapy, eyeglasses with colored lenses, eyeglasses with differently-tinted lenses for each eye, context-base dynamic rendering of digital content, special fonts, light control and sampling devices, text to speech devices, and extra reading time in examinations. Each approach has disadvantages. Eye patches are uncomfortable, embarrassing and do not eliminate reversals, inversions and moving text.

One apparatus described, in U.S. Pat. No. 4,979,902 to Morelle, et al. (1990), is eyeglasses that block peripheral vision. This aid may give the brain less visual information to process, but does not correct reversals, blurring, inversions, and moving text. This apparatus is dangerous since with peripheral vision blocked, a wearer may not see a hazard. An apparatus described in U.S. Pat. No. 5,963,294, Schiffer, (1999), is eyeglasses that block one visual field. A wearer may not see a hazard. This aid is embarrassing to wear, expensive, and difficult to manufacture.

A similar device is eyeglasses with a restricted opening in the shape of a hole and slit. This apparatus is described in Foreign Patent Application 2,942,552, Danilo, (2010). The wearer can only see a tiny area. Reading speed is lost because the device reveals only a small segment of text at once. When a user loses their place, they have to remove the device to find it again. Again, this device would be embarrassing to wear and difficult and expensive to manufacture.

A reading aid, described in U.K. patent 2,393,690 to Bruce (2004) helps readers by focusing the eye on one word but does not eliminate reversals, inversions and moving text. Only one word or short phrase can be seen at once, so reading speed is diminished. When reading speed is low, comprehension of a text is significantly reduced.

Eye level reading rulers, described in U.K. patent 2,414,438 to Hext and Hext (2005) help readers by cutting out glare and focusing the eye on a line of text. The device does not eliminate reversals, inversions and moving text.

Vision therapy can help to improve eye tracking, and there is anecdotal evidence that it improves connections across the cerebral cortex. Results are erratic, and vision is improved for some patients but not others. Vision Therapy does not eliminated reversals, inversions and moving text. Vision therapy is expensive and time consuming. Eyeglasses with colored lenses, and eyeglasses with different colored lenses for each eye, are described in U.S. Pat. No. 9,028,064 to Harris, et al. (2015). Custom-made, these are expensive. They do not eliminate reversals, inversions and moving text.

Described in U.S. Pat. No. 10,242,588 to Thirupparangiri, et al. (2019), Context-base dynamic rendering of digital content, has the disadvantage that it does not work with printed content, or when viewing a scene. Described in U.S. Pat. No. 10,386,646 to Serdarevic, et al. (2019), Light control and sampling devices are expensive and difficult to produce. Another disadvantage of these devices is that they require a source of electricity to work.

Large print and special fonts do not work with existing normal font size books and printed content. Text to speech devices are slow, error prone, expensive, and loud. A current method of helping dyslexic students is to give extra reading time for assignments, tests, and examinations. This is expensive, requires extra staff, requires extra test taking facilities, is time consuming and stressful for students. An extra-time accommodation requires a diagnosis, that is costly and difficult to obtain.

The prior art does little to help the brain to assimilate the visual information from the left and right visual fields of a single eye, and from both eyes, correctly. It does nothing to compensate for the symmetrical pattern of rods and cones in dyslexic people. It does not compensate for the lack of a dominant eye in dyslexic people. Currently there is no quick, affordable method for diagnosing or screening for dyslexia or visual processing disorder and many people slip through the cracks.

BRIEF SUMMARY

In accordance with one embodiment, a visual processing aid comprises a housing, and an anchoring member with a uniform change in the value of a property.

Advantages

Accordingly several advantages of one or more aspects are as follows: to provide visual processing aids that help the brain assimilate the visual information from the left and right visual fields of a single eye, that helps the brain assimilate the visual information from both eyes, that will compensate for the symmetrical pattern of rods and cones, that will compensate lack of a dominant eye, that will eliminate reversals, inversions, blurring, disappearing, and moving text, that will allow the user to see the entire visual field, that are safe, that are discreet, neat, comfortable, light, quick, easy and convenient to use, that are relatively inexpensive and easy to manufacture, that increase reading speed and comprehension, that can be used to diagnose dyslexia or a visual processing disorder cheaply, easily and quickly, that can be used to quickly and inexpensively screen large numbers of students or patients for dyslexia or visual processing disorder, that will prevent students with dyslexia or visual processing disorder slipping through cracks in the education system, that will improve brain connections, that will ameliorate disorders related to poor connections between the right and left hemisphere of the brain. Other advantages of one or more aspects will be apparent from a consideration of the drawings and ensuing description.

BRIEF DESCRIPTION OF THE SEVERAL VIEWS OF THE DRAWINGS

FIG. 2A to 2C show prior art, four components of visual information and an incorrect image assimilated by a brain.

Figure 24:
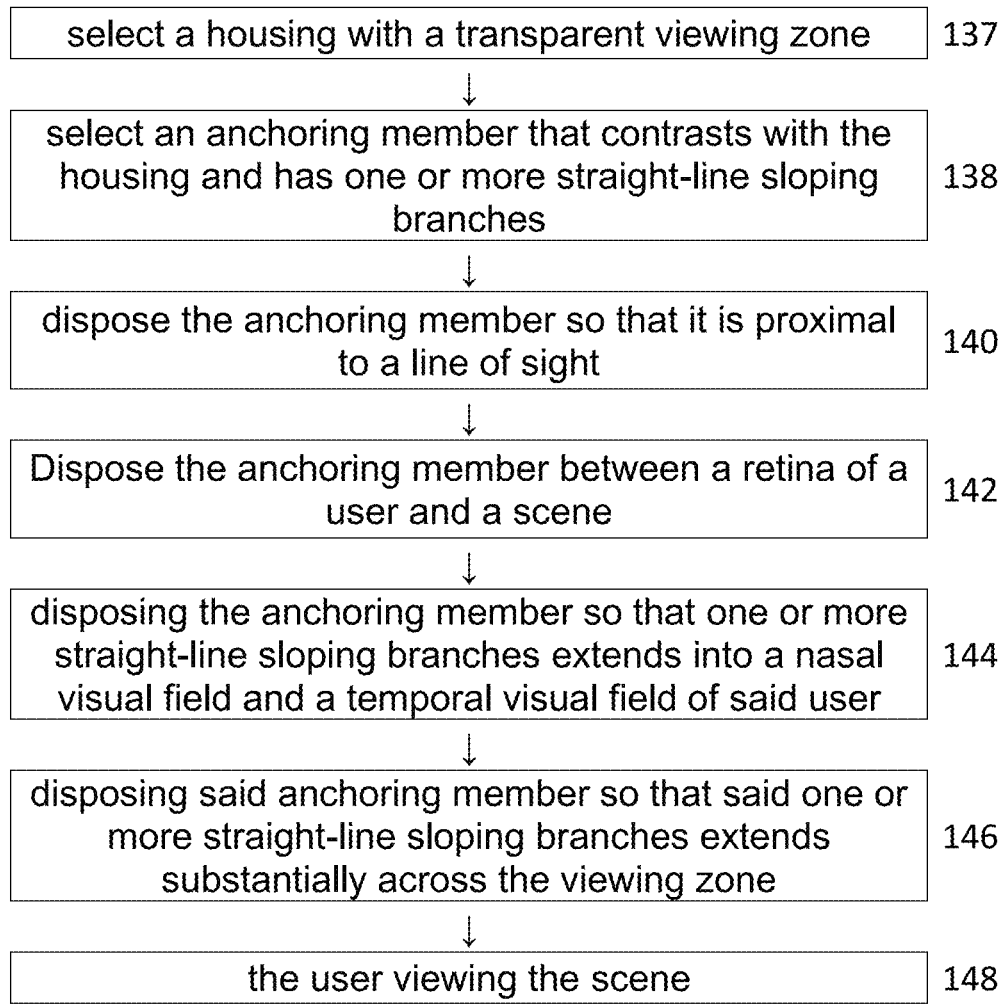
FIG. 24 shows a flowchart of a method for enhancing processing of visual information in accordance with another embodiment.
Figure 25:
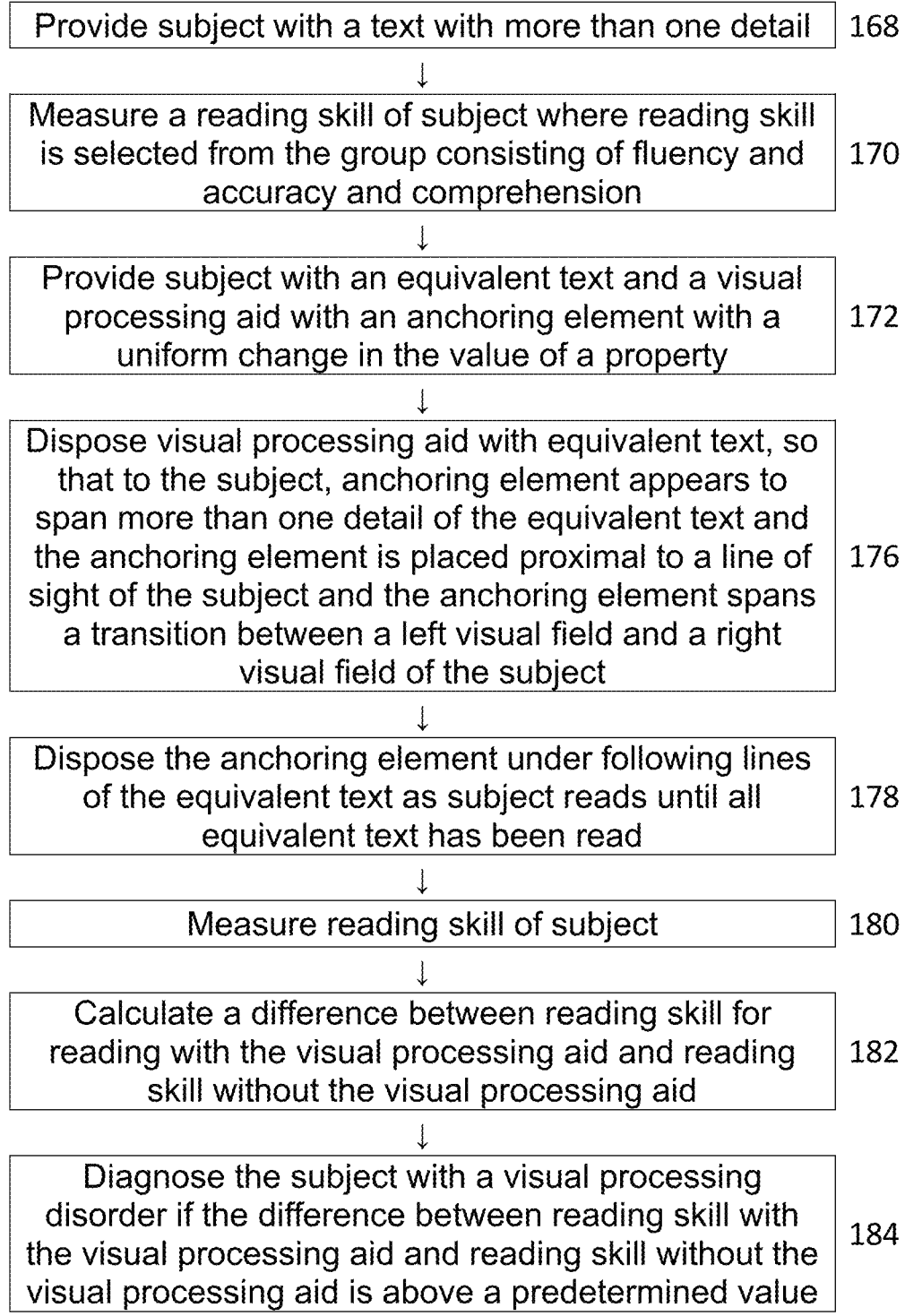
FIG. 25 shows a flowchart of a method for diagnosing of a visual processing disorder in accordance with another embodiment.
Figure 26:
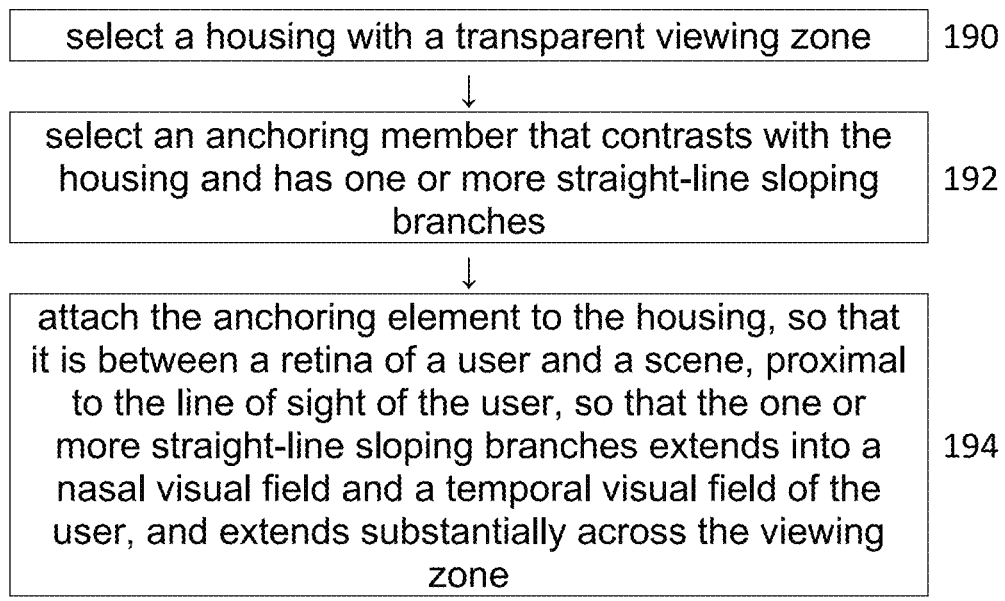
FIG. 26 shows a flowchart of a method for producing a visual processing aid in accordance with another embodiment.

Drawings - Reference Numerals 27 corpus collosum
28 left visual cortex
30 left hemisphere
32 second optic nerve
34 third optic nerve
36 left eye
38 left temporal retina
40 left nasal retina
41 prior art
42 left visual field of left eye
43 visual information component from left visual field of left eye
44 scene
45 line of sight
46 right visual field of left eye -continued Drawings - Reference Numerals 47 visual information component from right visual field of left eye
48 left eye transition line
49 transition zone
50 right eye transition line
52 left visual field of right eye
53 visual information component from left visual field of right eye
54 right visual field of right eye
55 visual information component from right visual field of right eye
56 right nasal retina
58 right temporal retina
60 right eye
62 first optic nerve
64 fourth optic nerve
66 optical pathway
68 right hemisphere
69 right visual cortex
70 brain
71 incorrect image
73 correct image
74 housing
76 anchoring element
78 first branch
80 second branch
82 corner
84 upper edge
86 lower edge
88 top side
89 cutout
90 hinge
91 handle
92 upper blocker
93 viewing zone
94 lower blocker
95 lens
96 first-outer layer
97 middle layer
98 second-outer layer
99 hole
100 top left extreme of the left lens
102 lower right extreme of the left lens
103 left lens
104 top right extreme of the right lens
105 right lens
106 lower left extreme of the right lens
108 first end
109 second end
110 light source
112 switch
114 power unit
116 connection one
118 connection two
120 connection three
122 pivot
123 frame
124 display surface
125 hook
126 fulcrum
128 strut
138, 140, 142, 144, 146 FIG. 24 Flow chart steps
168, 170, 172, 176, 178, 180, 182, 184 FIG. 25 Flow chart steps
190, 192, 194 FIG. 26 Flow chart steps

DETAILED DESCRIPTION

Figure 4:
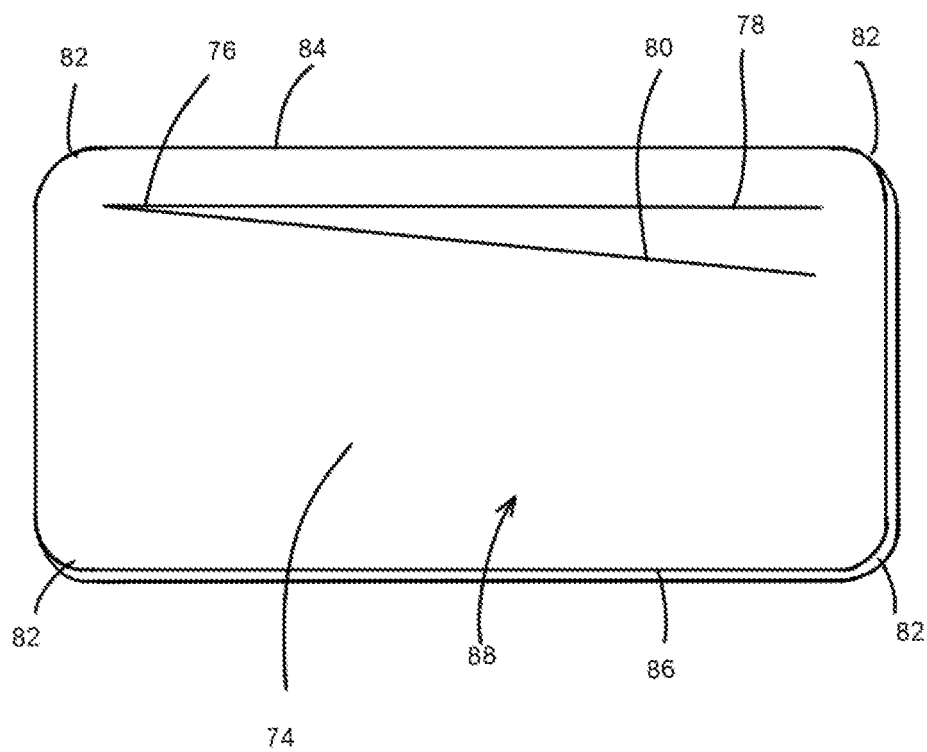
FIG. 4 shows a different view of the embodiment shown in FIG. 3A.

FIG. 4—First Embodiment

One embodiment of a visual processing aid is illustrated in FIG. 4. The visual processing aid has a thin housing 74 configured as a reading overlay. The housing is of uniform cross-section and consists of a sheet of transparent, clear acrylic. The housing is typically 0.1 mm to 4 mm in thickness, and has overall dimensions roughly 200 mm×90 mm. The housing consists of a transparent acrylic. The housing may be formed by cutting. Outer corners 82 of the housing are typically beveled or rounded to avoid snagging and personal injury.

On a top side 88 of the housing, an anchoring member 76 is screen printed. The anchoring member is screen printed; however, the anchoring member can be attached to the housing by any application technique such as, but not limited to heating, adhesion, engraving, etching, printing, painting, laminating, etcetera. The anchoring member is opaque. The anchoring member has a flat branch 78 positioned parallel to an upper edge 84 of the housing. The flat branch is typically 10 mm to 30 mm distance from the upper edge and 50 mm to 110 mm from a lower edge 86. The flat branch is typically 100 mm to 190 mm long and 0.1 mm to 2 mm wide. The anchoring member is long enough to appear to span at least two words in the text, and can be long enough to appear to span whole lines of text. A straight-line sloping branch 80 meets the flat branch, and slopes away from the flat branch at an angle that is typically 5 degrees to 35 degrees. The straight-line sloping branch meets the flat branch; however, the straight-line sloping branch can be proximal to the flat branch. There are two branches; however, there can be one branch. There are two branches; however, there can be multiple branches. The flat branch is black but may be any color. The straight-line sloping branch is red but may be any color.

The anchoring member has a uniformly changing height along an axis that is parallel to the lines of text in a scene 44, and in this embodiment is also asymmetrical about that axis. The housing has a longitudinal axis or horizontal axis which is parallel to the upper edge 84. An orthogonal or vertical axis is perpendicular to the longitudinal axis and crosses the upper edge 84 and the lower edge 86. A lateral axis is perpendicular to both the longitudinal axis and orthogonal axis and crosses through the apparatus from the top side 88. The straight-line sloping branch is oblique to both the longitudinal and orthogonal axes.

Operation

Figure 1:
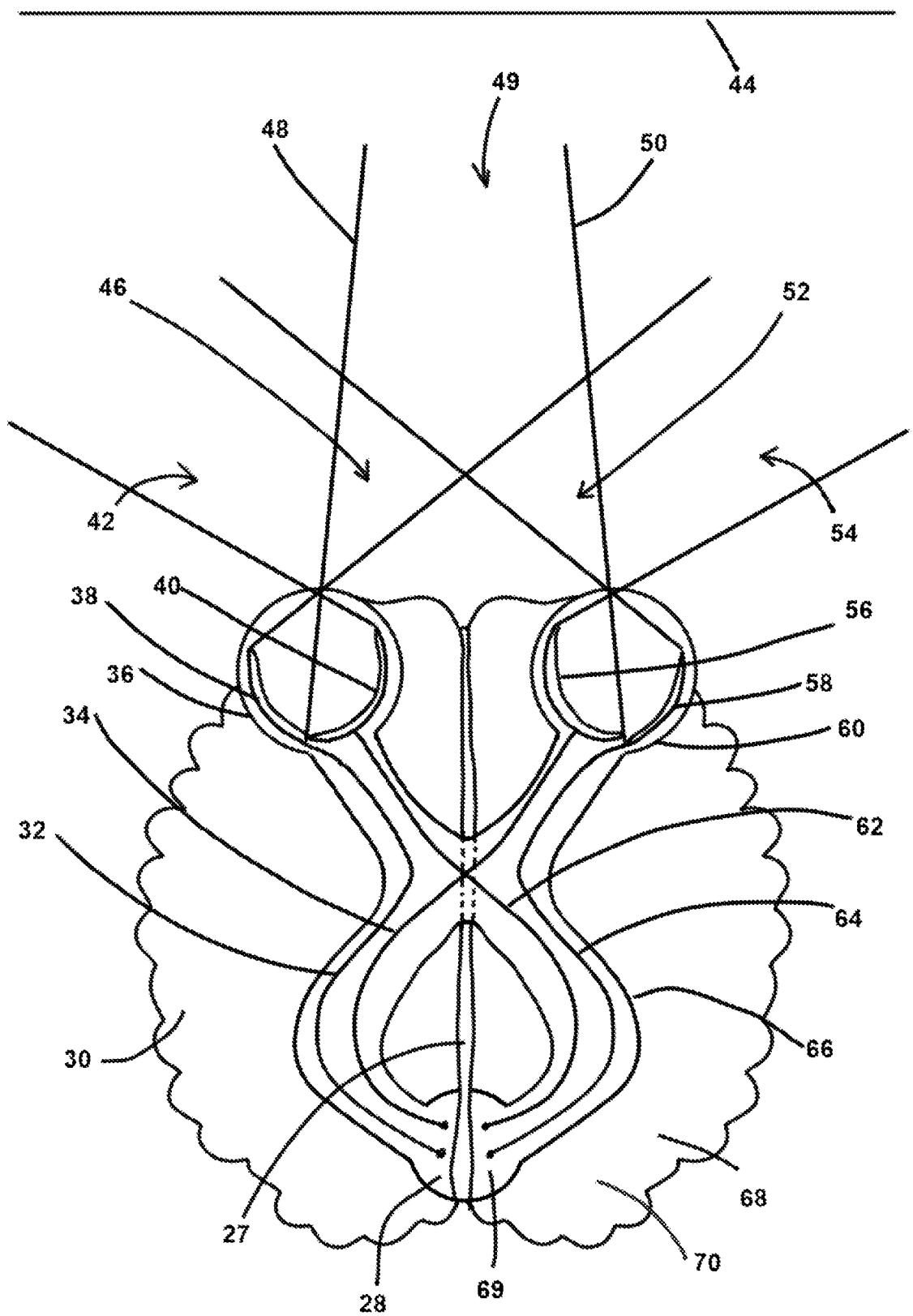
FIG. 1 shows a simplified cross-section through a brain and the pathways of visual information from a scene to the visual cortex regions in the brain.

FIG. 1 shows a simplified cross section through a brain 70 and pathways of visual information from a scene 44 to a left visual cortex 28 and a right visual cortex 69 in a brain 70. A corpus collosum 27 connects a left hemisphere 30 and a right hemisphere 68 of the brain. The scene can be a page, with multiple lines of text, each containing many words, composed of numerous letters. The visual information from the scene is complex. On route to the brain, the visual information is divided. Initially, the visual information is in two parts, with visual information going to a left eye 36, and a right eye 60. The visual information is also inverted.

To add to the complexity, the visual information reaching the left eye is split further as visual information originating in a left visual field of left eye 42 reaches a left-nasal retina 40, while visual information originating in a right visual field of left eye 46 reaches a left-temporal retina 38. Visual information from the left-nasal retina is passed along a first optic nerve 62 in an optical pathway 66 to the right visual cortex. Visual information from the left-temporal retina is passed along a second optic nerve 32 to the left visual cortex.

Conversely, the visual information reaching the right eye is also split. Visual information originating in a left visual field of right eye 52 reaches a right-temporal retina 58, while visual information originating in a right visual field of right eye 54 reaches a right-nasal retina 56. Visual information from the right-nasal retina is passed along a third optic nerve 34 to the left visual cortex. Visual information from the right-temporal retina is passed along a fourth optic nerve 64 to the right visual cortex. Throughout the remainder of this specification, references are made back to FIG. 1 as necessary.

FIG. 2A shows an example of prior art 41. The prior art is placed along a line of sight 45 and a scene 44 viewed through it. FIG. 2B shows four components of visual information, namely visual information component from left visual field of left eye 43, visual information component from right visual field left eye 47, visual information component from left visual field of right eye 53 and visual information component from right visual field of right eye 55. The four components have to be assimilated and inverted by the brain 70. Ideally, one clear image is perceived. If the scene contains many small details, such as those of letters, and words, the brain can have a difficult time resolving the visual information. As the brain works to process the four components it makes mistakes. It may not correctly invert components, which leads to confusion between characters, such as "p" and the number "9." The brain may flip some components laterally, leading to confusion between letters such as "b" and "d", or between words such as "saw" and "was". When the background or surroundings of the scene are plain, symmetrical horizontally, or symmetrical vertically, it is more difficult for the brain to assimilate a correct image.

Further, the brain may shift the four components around, until they coincide and produce a meaningful image of the text. In a well-functioning brain, visual processing is easy, and a crisp image is assimilated, quickly. In a poorly-functioning brain, such as a brain with weak or no connections across the corpus collosum, the result is a nonsensical image, composed of text that appears to move, is blurred, disappears, inverts, switches sides, and floats around the page. FIG. 2C shows a snapshot of an incorrect image 71 assimilated using prior art.

Figure 3A:
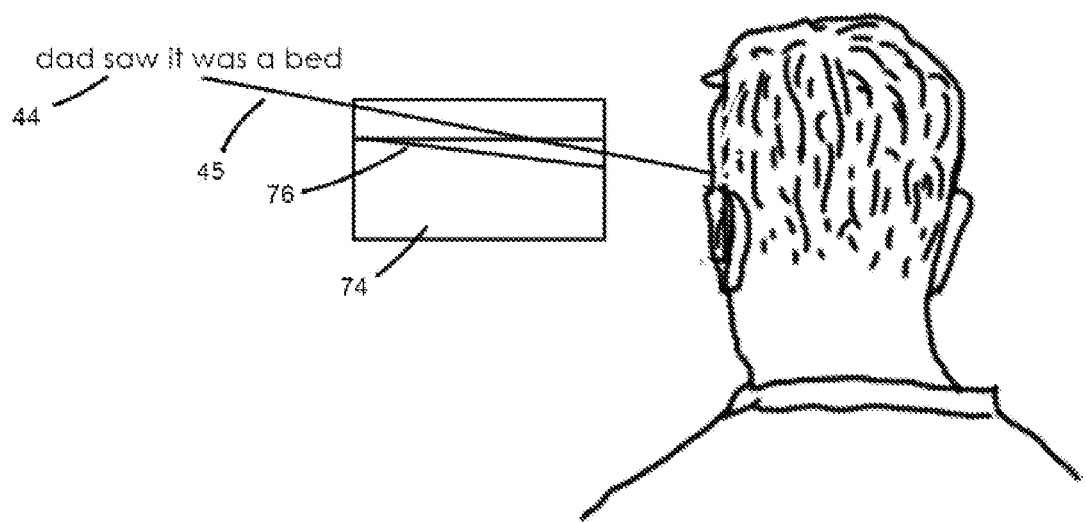
FIG. 3A to 3C show an embodiment, four components of visual information and a correct image assimilated by a brain, in accordance with one embodiment.
Figure 3B:

The visual processing aid shown in FIG. 3A, and other embodiments, provide a solution. The visual processing aid shown in FIG. 3A is placed so that it is proximal to a line of sight 45. An anchoring member 76 adds visual information, that changes predictably, across a scene 44, and gives the brain 70, additional visual information, that helps to locate where the components came from, and how they fit together. FIG. 3B illustrates components 43, 47, 53, and 55, produced with the embodiment shown in FIG. 3A. An anchoring member 76 differentiates visual information arriving from all visual fields. The anchoring member helps the brain resolve the components easily and accurately.

Figure 3C:

It is easier to process visual information from the simple anchoring member than from the complex and detailed scene, but in assimilating an image of the anchoring member, an image of the scene is correctly assimilated too. Additionally, any anchoring member that is also asymmetrical about an axis that is parallel to the lines of text, also differentiates visual information vertically, helping the brain invert the image more easily and more accurately. FIG. 3C shows a correct image 73. When the brain can resolve the components easily, quickly and accurately, reading speed and accuracy are improved and the brain is less tired.

The manner of using the visual processing aid follows. One places the housing upon text in the scene. The housing is placed so that the upper edge is parallel to the lines of text and the anchoring member is below a line of text to be read. The housing is positioned so that the anchoring member appears to span at least two words in the text. The housing is positioned so that the anchoring member crosses over a transition zone 49. The transition zone extends over a left eye transition line 48 and a right eye transition line 50. For example, if the text is in a book, one holds the book so that the page is central, and places the visual processing aid so that the anchoring member is below an entire line of text. Fingers are placed upon the top side of the housing proximal to the lower edge. As one finishes viewing the line of text one moves the housing so that a next line of text is above the anchoring member.

FIGS. 5, 6, 7, 8 and 9A to 9F—Additional Embodiments

Figure 5:
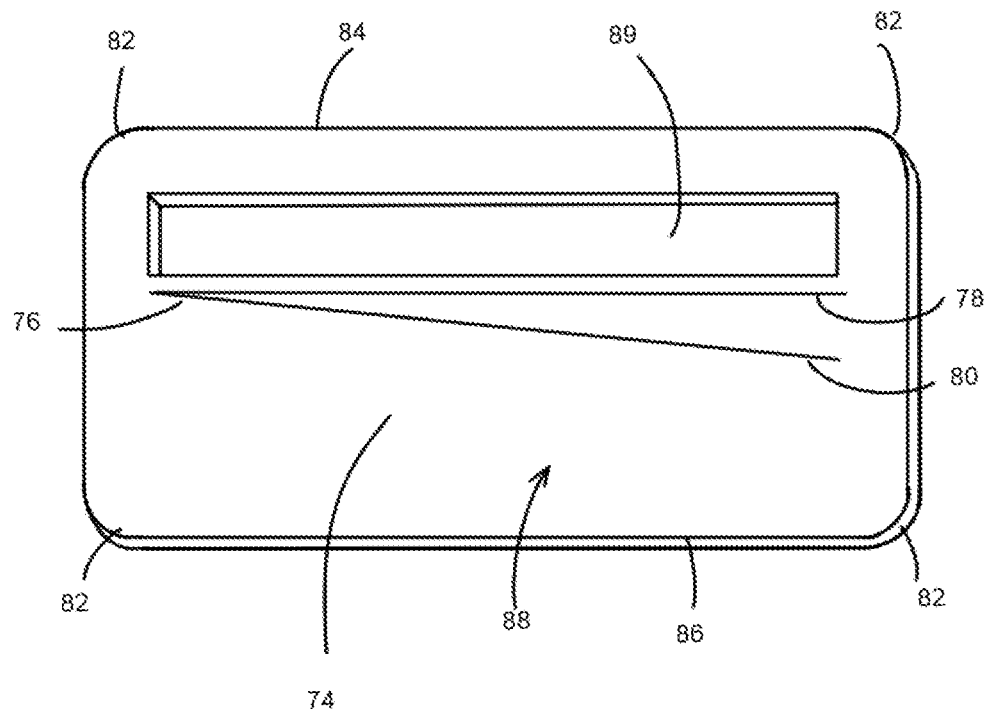
FIG. 5 shows a visual processing aid with a cutout in accordance with another embodiment.
Figure 6:
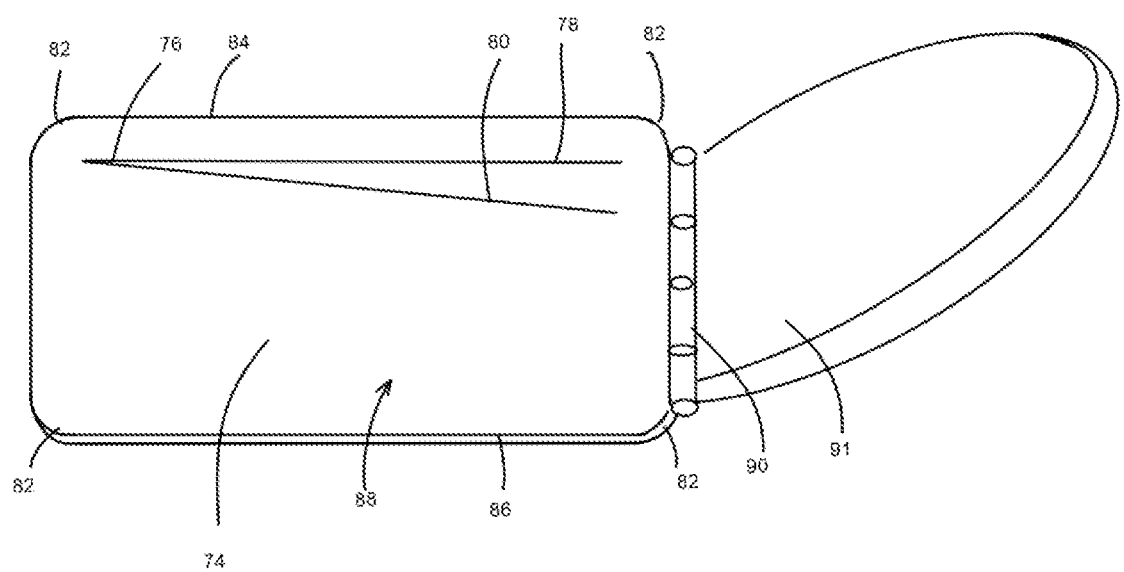
FIG. 6 shows a visual processing aid with a handle in accordance with another embodiment.
Figure 7:
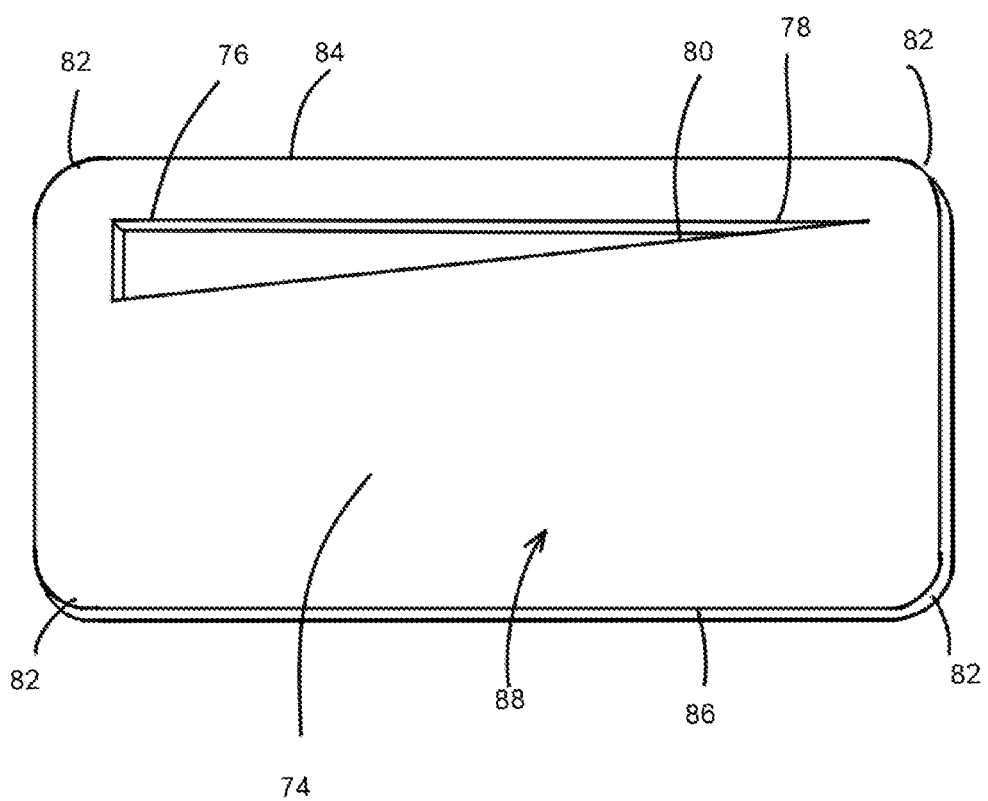
FIG. 7 shows a visual processing aid with an anchoring member that is a cutout for viewing text in accordance with another embodiment.
Figure 8:
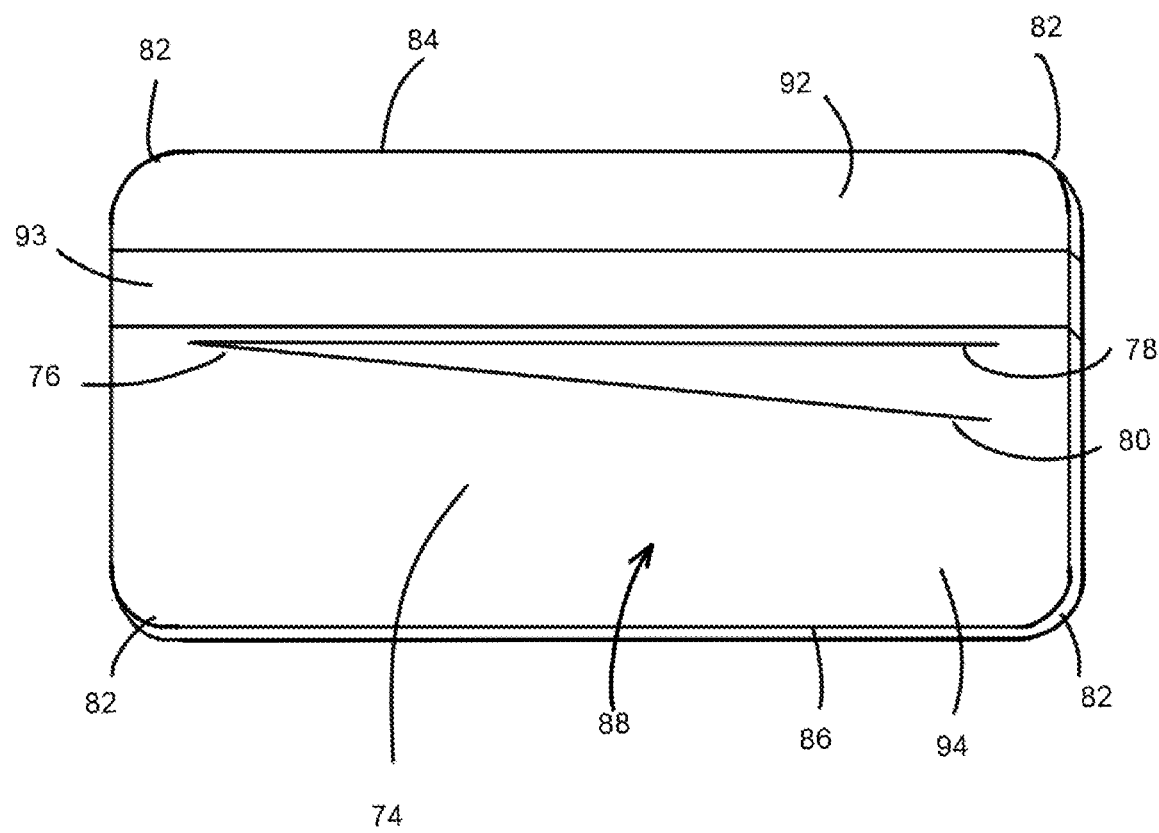
FIG. 8 shows a visual processing aid with transparent and opaque regions in accordance with another embodiment.

Additional embodiments are shown in FIGS. 5, 6, 7 and 8; in FIG. 5 housing 74 has a cutout 89 for viewing text; FIG. 6 shows a housing 74 with a foldable handle 91 for ease of use, 91 attached by a hinge 90; an embodiment shown in FIG. 7 has an anchoring member 76 that is an aperture for viewing text; FIG. 8 shows an embodiment of a visual processing aid that has a transparent viewing zone 93, that is bordered by two opaque regions for obscuring surrounding text, an upper blocker 92 and a lower blocker 94.

Figure 9A:
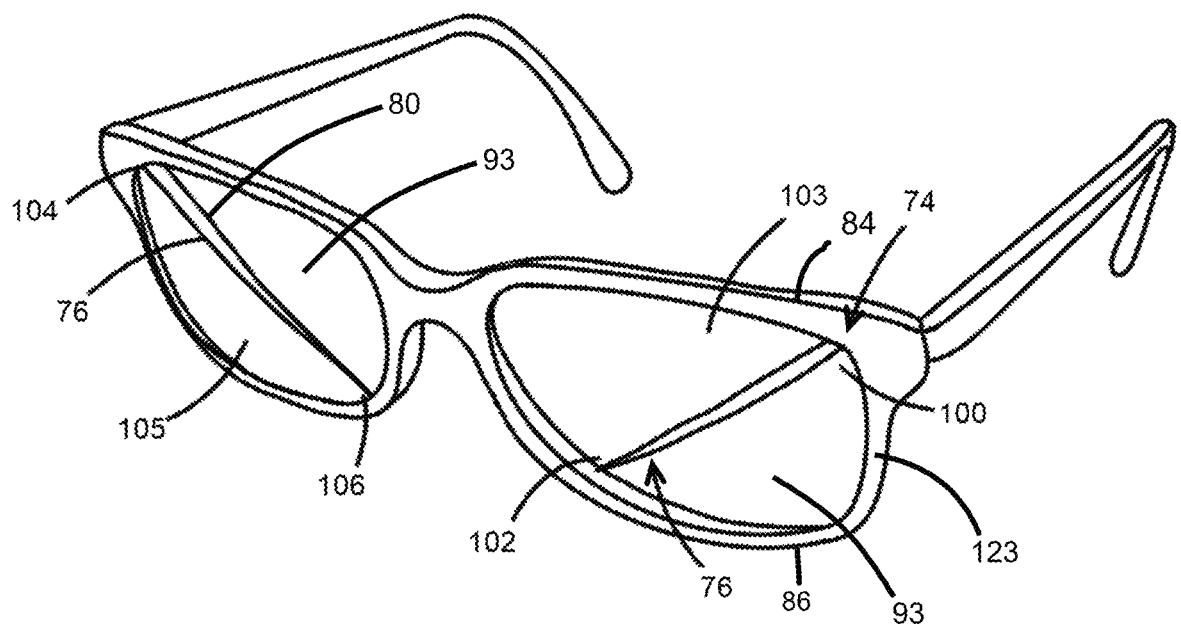
FIG. 9A to 9F show visual processing aids comprising eyeglasses and lenses in accordance with other embodiments.
Figure 9B:
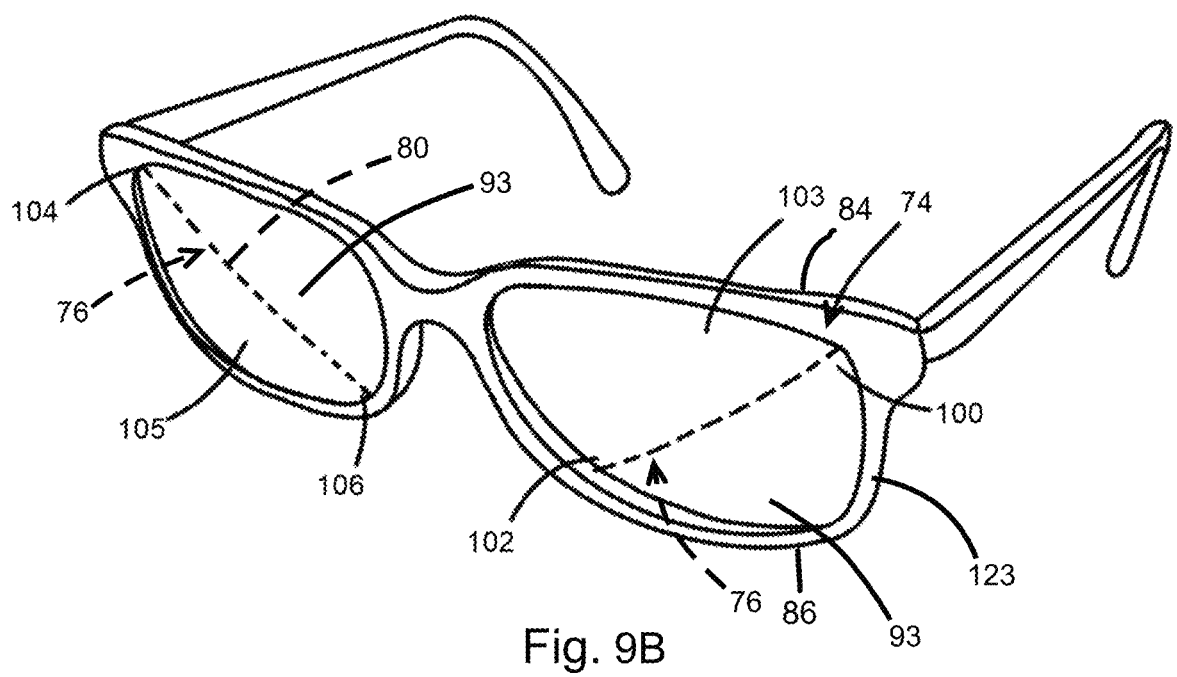
Figure 9C:
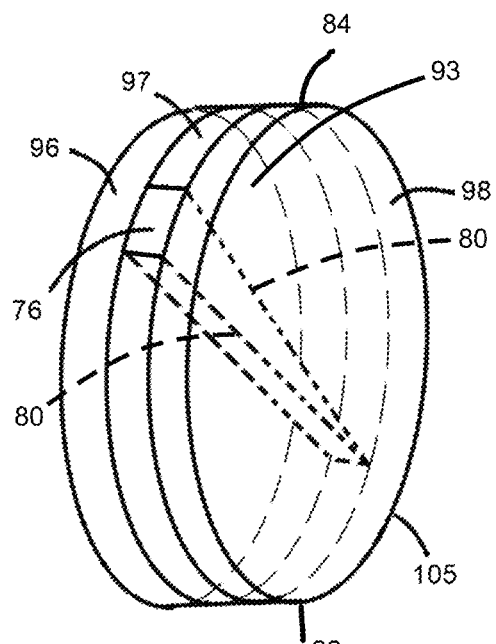
Figure 9D:
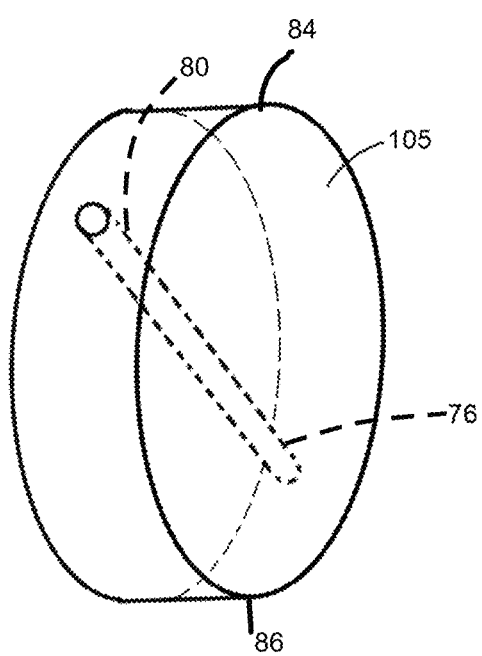
Figure 9E:
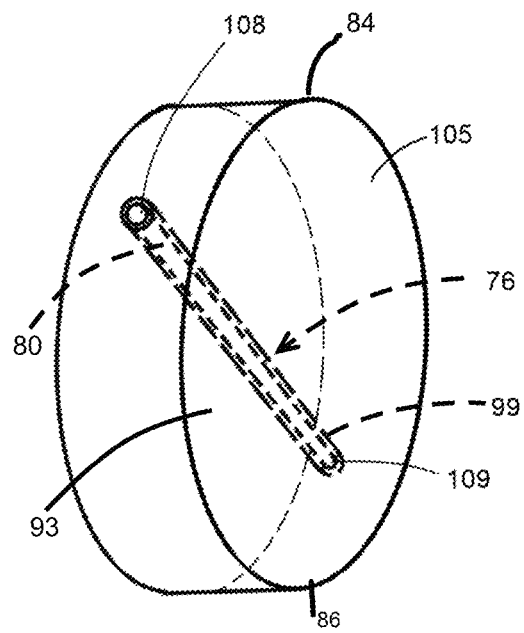
Figure 9F:
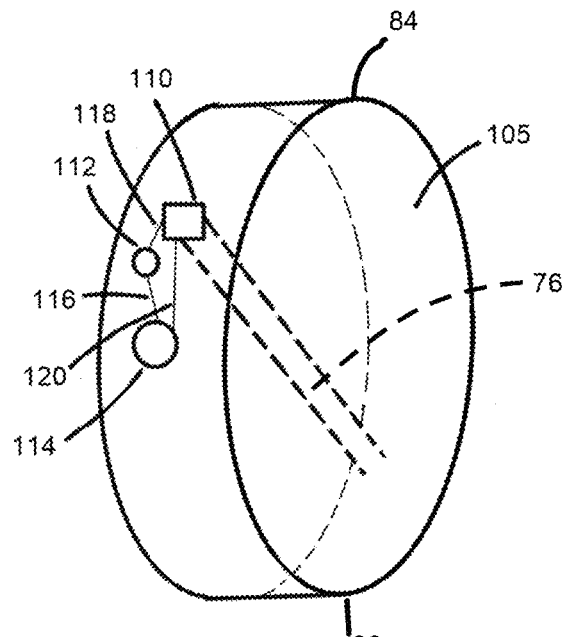

Alternative embodiments of a visual processing aid are illustrated in FIG. 9A to 9F; FIG. 9A shows an embodiment configured as eyeglasses, a right lens 105, is a mirror image of a left lens 103, that has a laminated anchoring member 76 reaching from a top left extreme of the left lens 100, to a lower right extreme of the left lens 102, an additional anchoring member 76 extends from a top right extreme of the right lens 104 to a lower left extreme of the right lens 106; FIG. 9C shows more detail of right lens 105 of the embodiment illustrated in FIG. 9A; an anchoring member 76 is embedded into a middle layer 97, on one side of middle layer 97, a first-outer layer 96 is laminated, on the opposite side of middle layer 97 a second-outer layer 98 is laminated; FIG. 9B shows another possibility for an embodiment configured as eyeglasses that has an anchoring member 76 that is a tunnel shape; FIG. 9D shows detail of right lens 105 of the embodiment shown in FIG. 9B, wherein tunnel-shaped anchoring member 76 is bored into right lens 105; FIG. 9E has an anchoring member 76, in the shape of a rod inserted into hole 99; the anchoring member 76 is made from polycarbonate that is tinted to be darker towards first end 108, and lighter towards second end 109, to provide a uniform change in the value of a property, hole 99 and anchoring member 76 can be horizontal, so that a uniform change in the value of a property is provided by a gradation of tint of anchoring member 76; FIG. 9F shows an alternative right lens 105 with an anchoring member 76 that is a beam of light that can be turned on or off, a power unit 114 is attached to a switch 112 with connection one 116, the switch 112 is connected to a light source 110 with connection two 118, and the light source 110 is attached to the power unit 114 with connection three 120.

FIGS. 10 to 23—Further Alternative Embodiments

Figure 10:
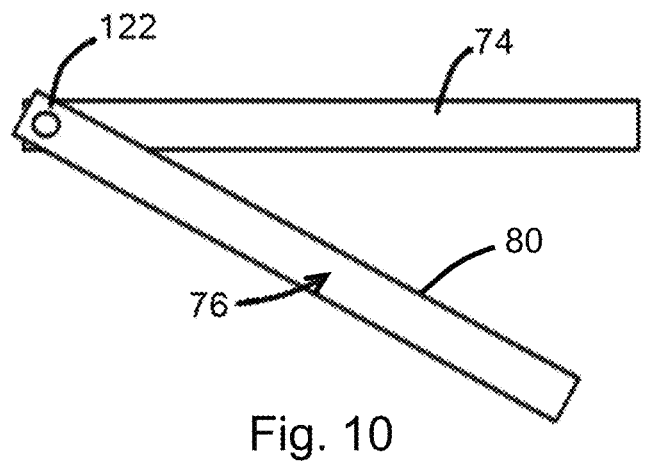
FIG. 10 shows a visual processing aid comprising a pivot in accordance with another embodiment.
Figure 11:
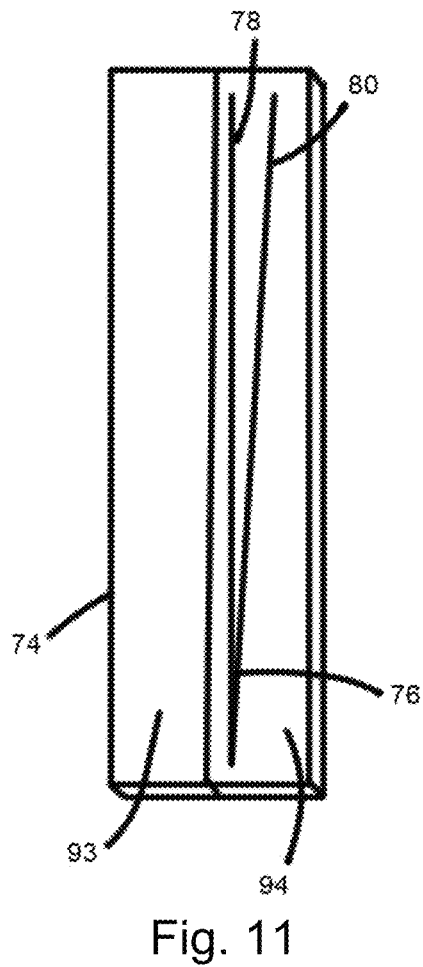
FIG. 11 shows a visual processing aid comprising a bookmark in accordance with another embodiment.
Figure 12:
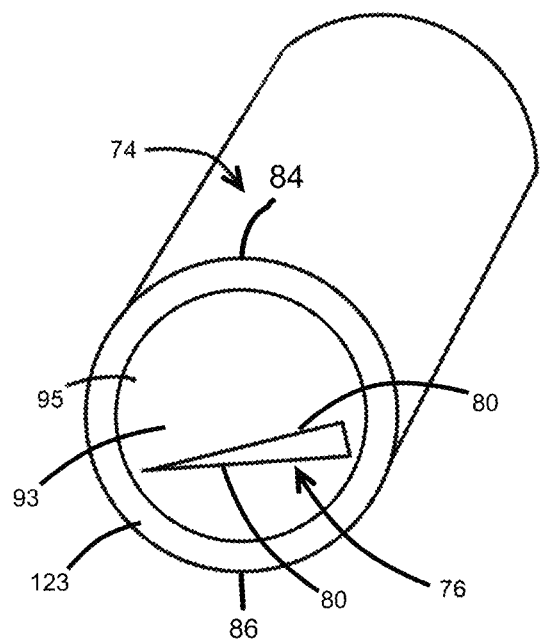
FIG. 12 shows a visual processing aid comprising a viewing tube in accordance with another embodiment.
Figure 13:
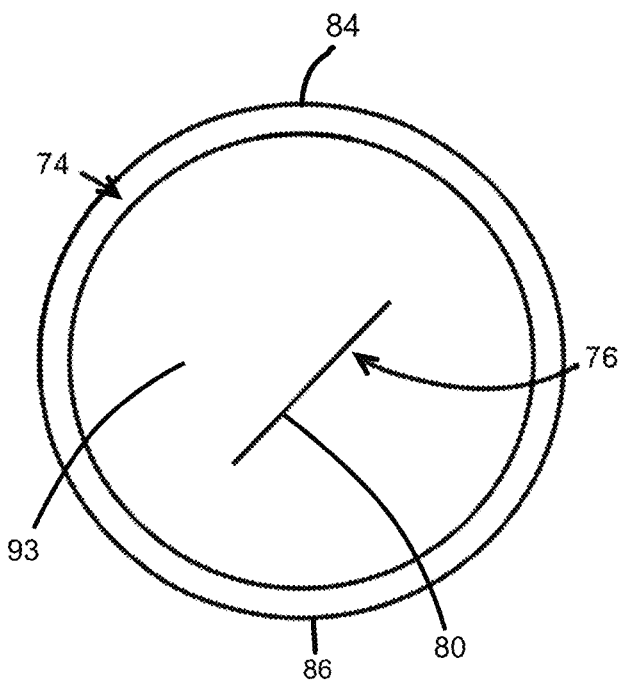
FIG. 13 shows a visual processing aid comprising a contact lens in accordance with another embodiment.
Figure 14:
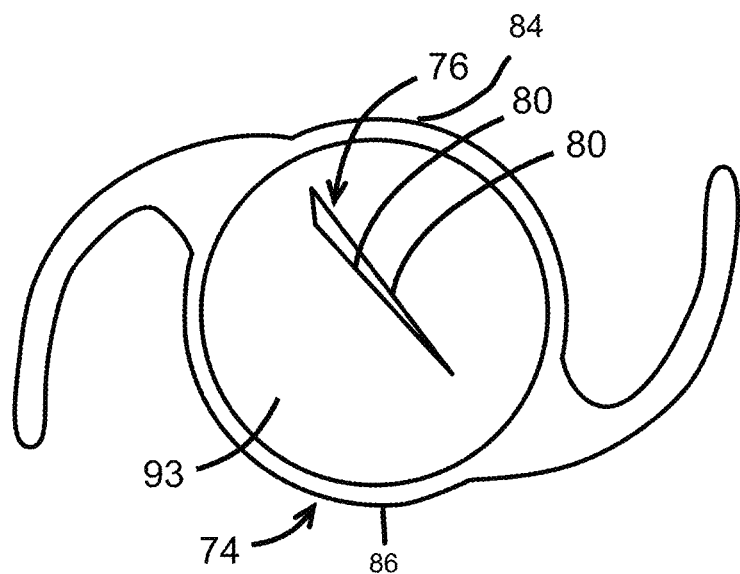
FIG. 14 shows a visual processing aid comprising an intraocular lens in accordance with another embodiment.
Figure 15:
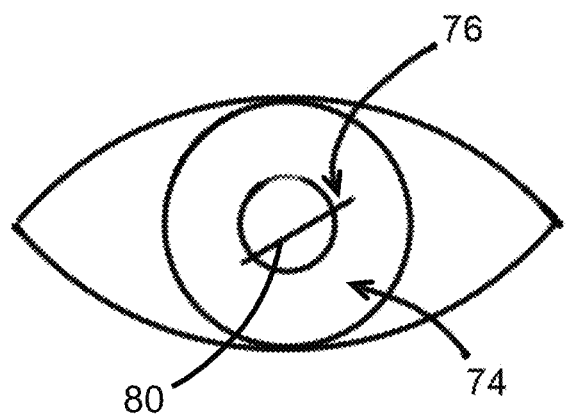
FIG. 15 shows a visual processing aid comprised with markings on part of an eye in accordance with another embodiment.
Figure 16:
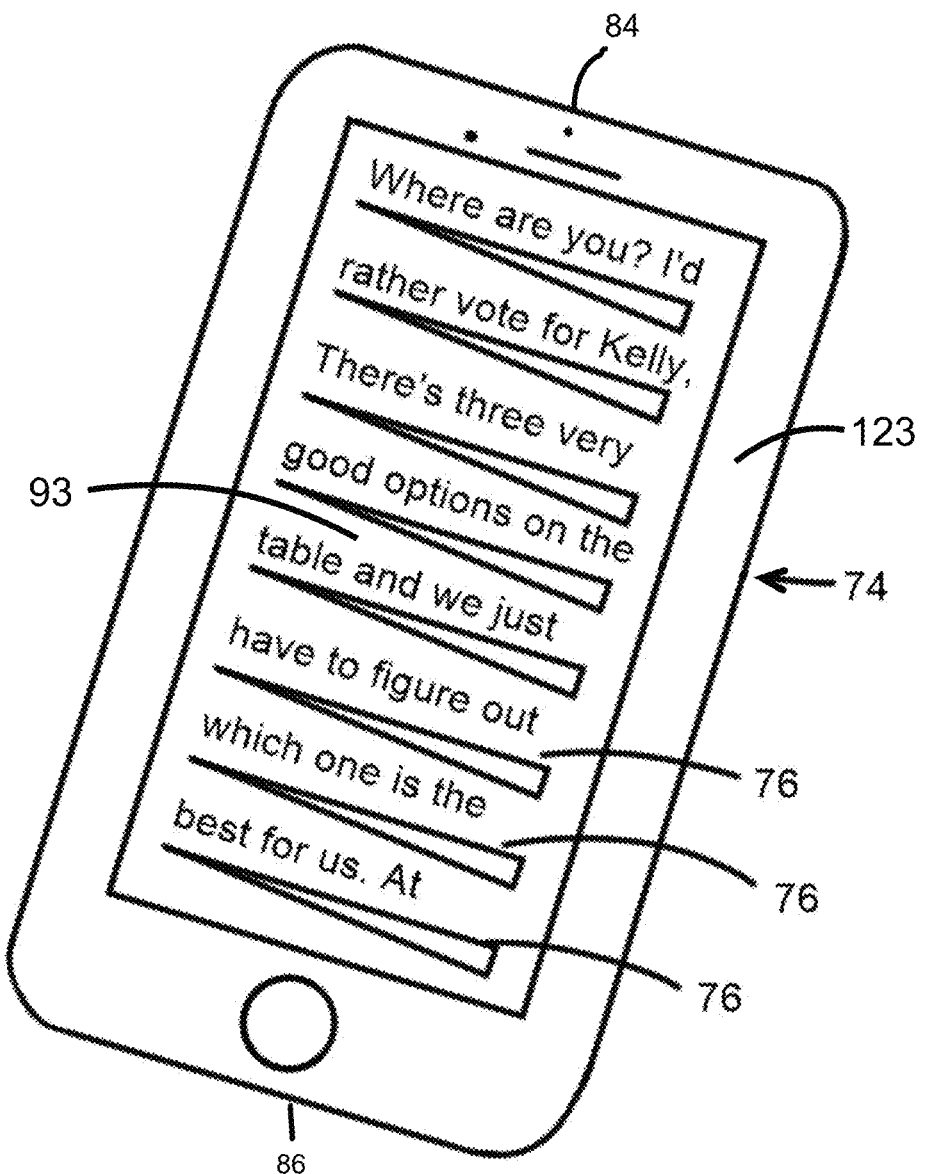
FIG. 16 shows a visual processing aid comprising text displayed by a mobile device in accordance with another embodiment.
Figure 17:
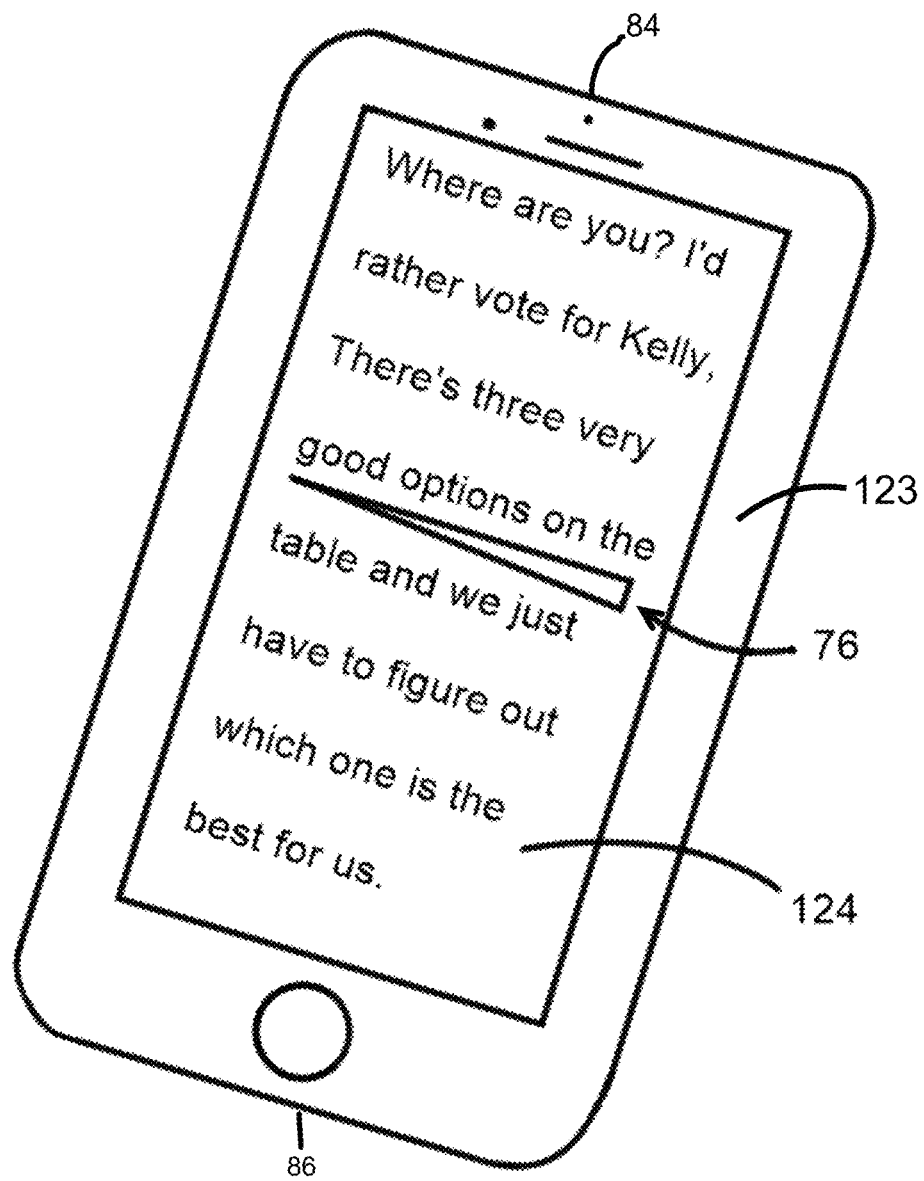
FIG. 17 shows a visual processing aid comprising a screen of a mobile device in accordance with another embodiment.
Figure 18:
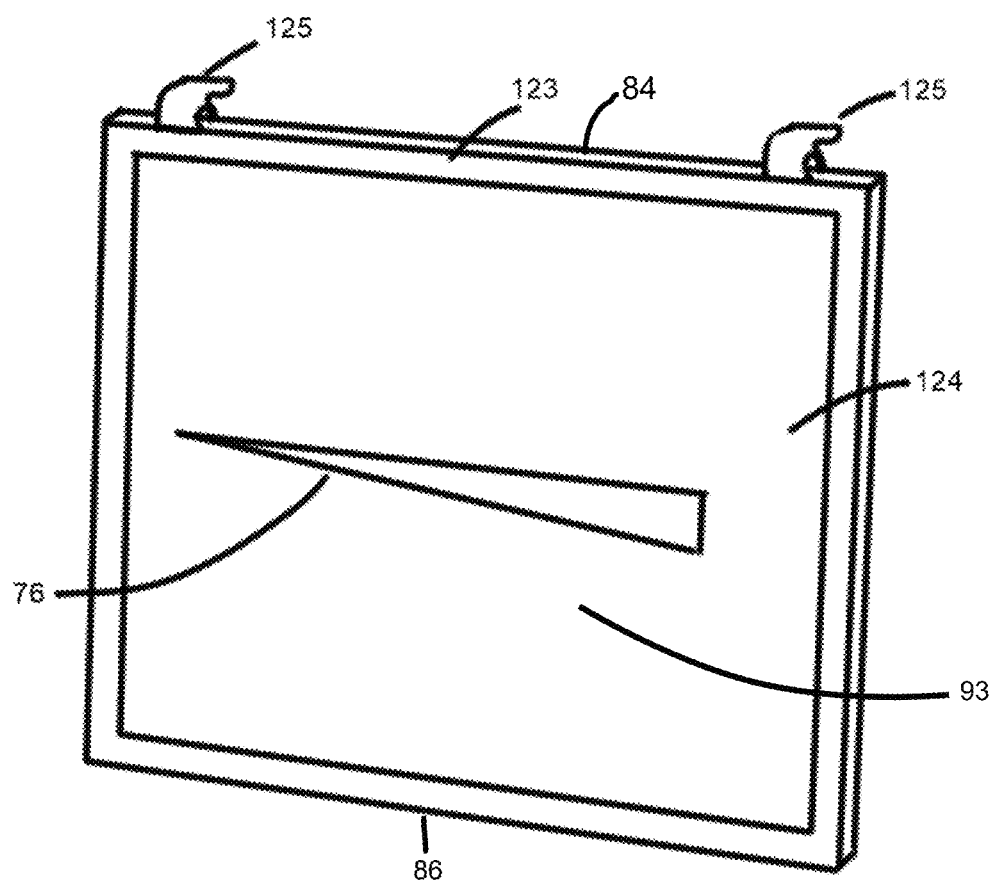
FIG. 18 shows a visual processing aid comprising a screen cover in accordance with another embodiment.
Figure 19:
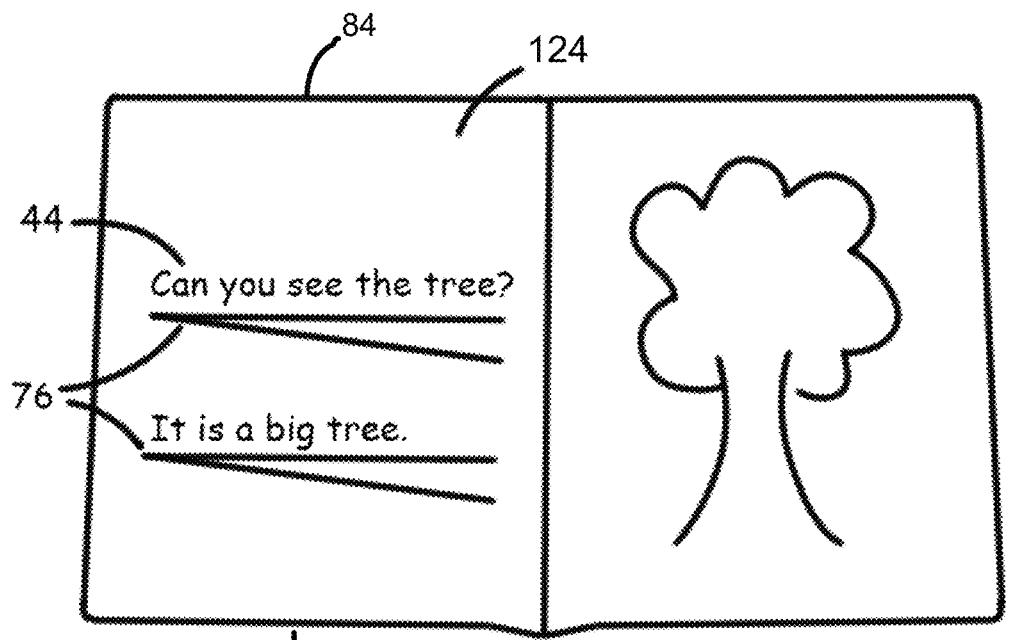
FIG. 19 shows a visual processing aid comprising a book with an anchoring member that is a plurality of predetermined shapes in accordance with another embodiment.
Figure 20:
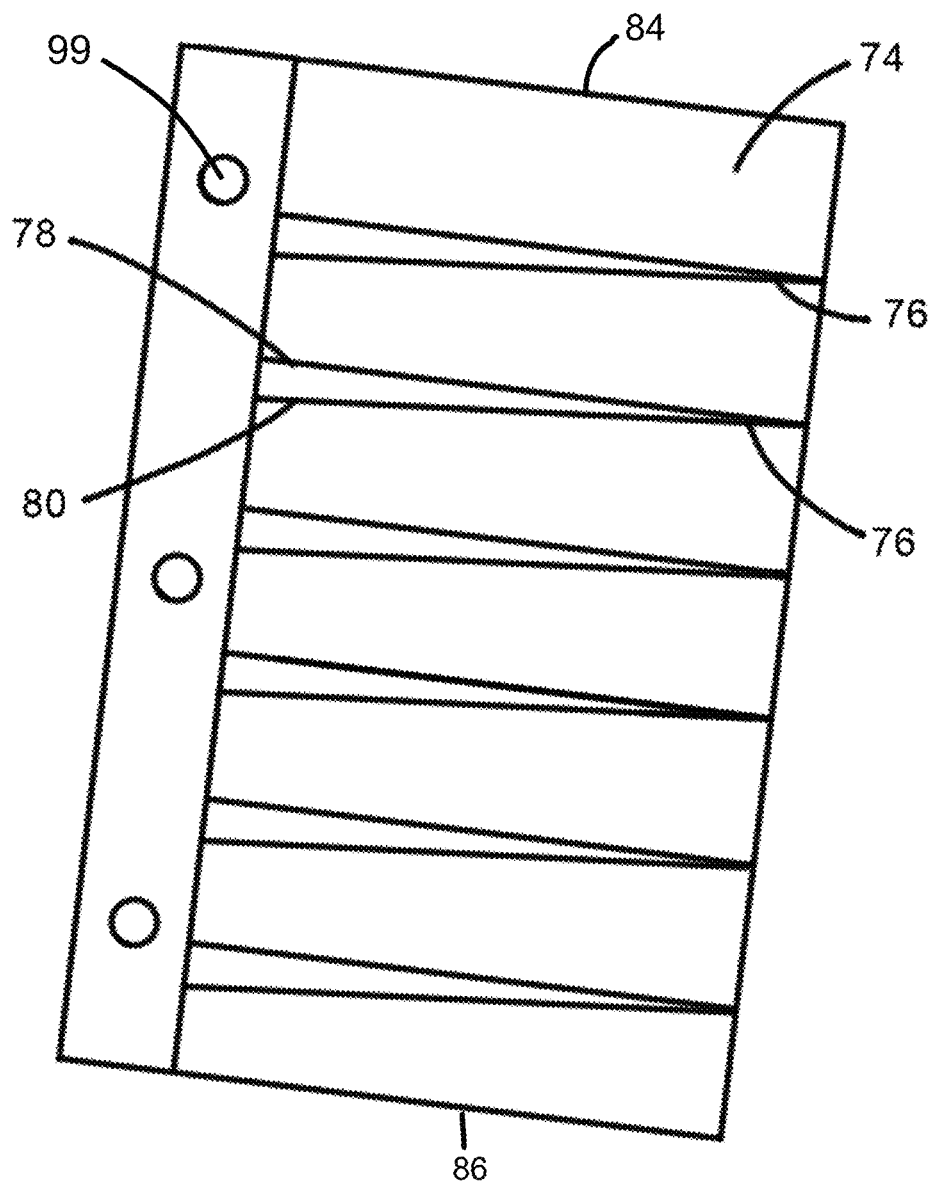
FIG. 20 shows a visual processing aid comprising a sheet of paper in accordance with another embodiment.
Figure 21:
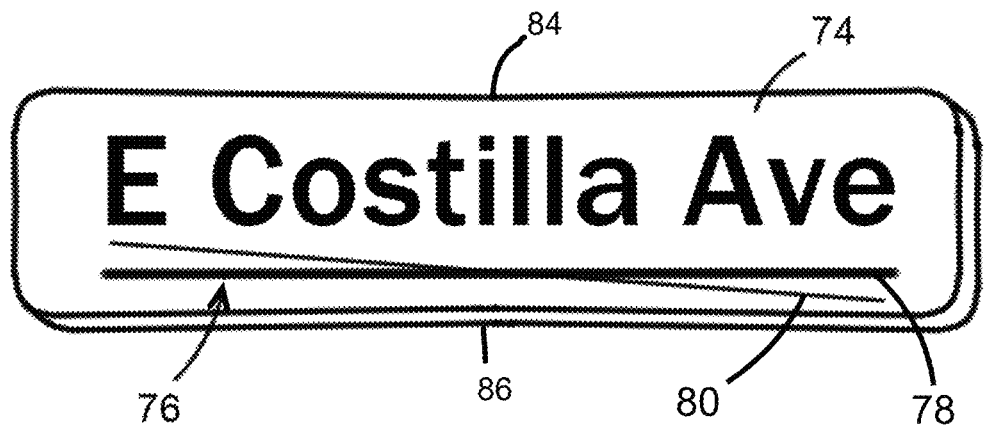
FIG. 21 shows a visual processing aid comprising a place name sign in accordance with another embodiment.
Figure 22:
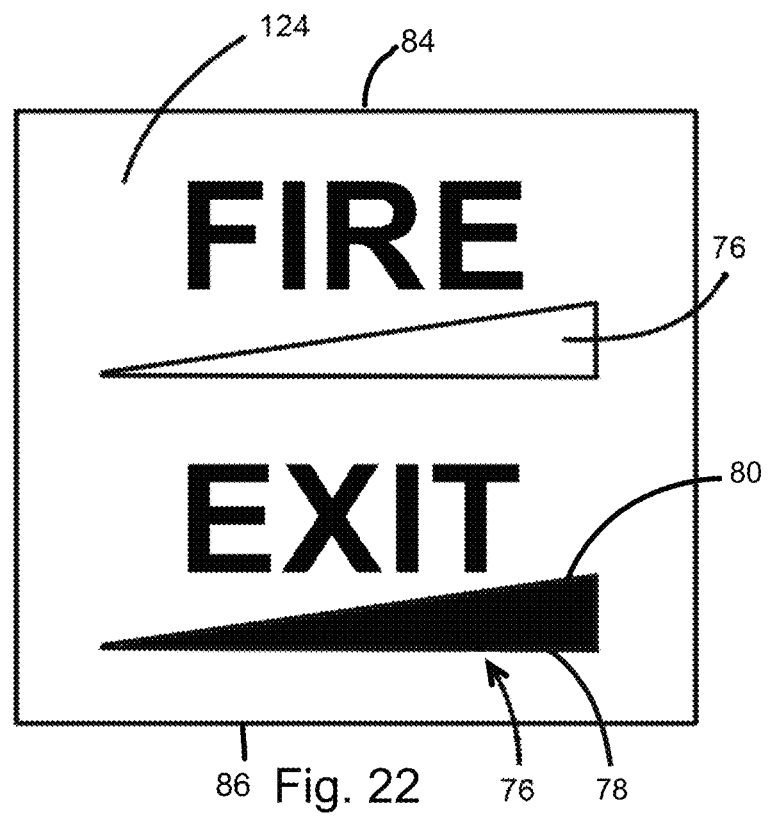
FIG. 22 shows a visual processing aid comprising a public safety sign in accordance with another embodiment.
Figure 23:
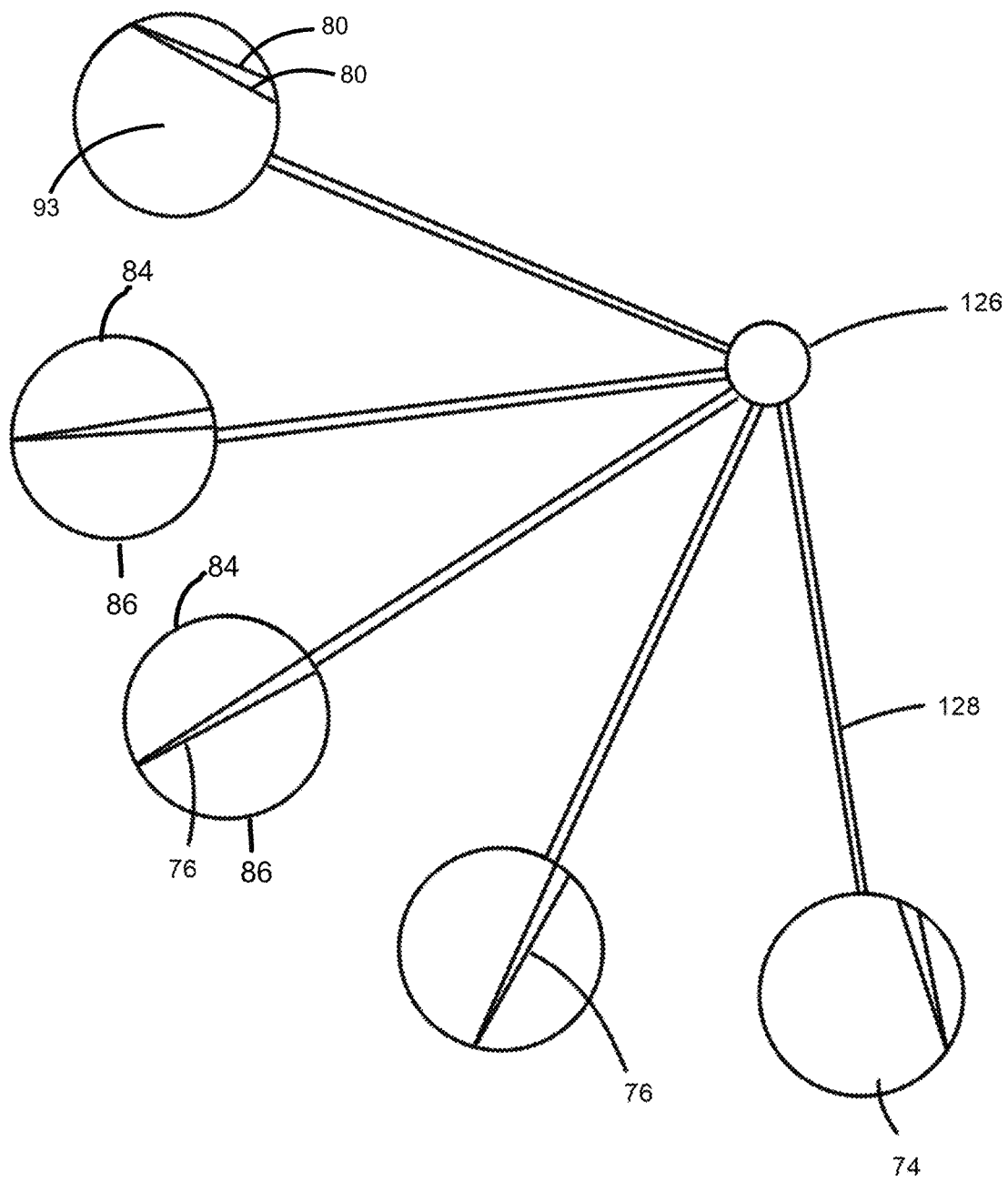
FIG. 23 shows a visual processing aid comprising a plurality of housings and a plurality of anchoring members in accordance with another embodiment.

FIGS. 10 to 23 illustrate further alternative embodiments; FIG. 10 shows a visual processing aid that has a housing 74 that is attached to an anchoring member 76 with a pivot 122 that enables the visual processing aid to be folded and stored; FIG. 11 shows a visual processing aid that has a housing 74 in the shape of a bookmark that has a viewing zone 93 and a lower blocker 94; FIG. 12 shows a visual processing aid that has a housing 74 in the form of a tube that is attached with lens 95 to anchoring member 76, such an embodiment will pass visual information from one eye only and can be handled by young students; FIG. 13 shows a visual processing aid that is in the form of a contact lens;

FIG. 14 shows a visual processing aid that is in the form of an intraocular lens; FIG. 15 shows a visual processing aid that has an anchoring member 76 that is formed by marking on part of an eye by tattoo or laser; FIG. 16 shows a visual processing aid that has a housing 74 that is in the form of text, attached in the text, are a plurality of anchoring members 76 that can be created by a software application and that can, for speed and convenience, move with the text; FIG. 17 shows a visual processing aid that has a display surface 124, the display surface is in the form of a screen for a mobile telephone, disposed on the screen is an anchoring member 76, typically, the anchoring member will remain stationary as text scrolls behind it, anchoring member 76 can appear temporarily and can be created by a software application; FIG. 18 shows a visual processing aid that has a display surface 124 configured as a screen cover that has a frame 123 for stability, attached to the frame are two hooks 125 for hanging the frame over a computer screen; FIG. 19 shows a visual processing aid that has a housing 74 configured in the form of a book, an anchoring member 76 is printed below the scene 44 which comprises text; FIG. 20 shows a visual processing aid that has a housing 74 configured in the form of a sheet of blank paper, that has multiple anchoring members 76 printed at regular intervals down the sheet for writing on; FIG. 21 shows an embodiment of a visual processing aid to improve road safety, with a holder 74 that is in the form of a place name sign; FIG. 22 shows a visual processing aid that has a display surface 124 in the form of a sign to improve public safety, that has an anchoring member 76 configured under each word on display surface 124; FIG. 23 shows a visual processing aid with multiple housings 74, each attached to one of many different struts 128, that rotate about a fulcrum 126, each housing has an anchoring member 76 attached, each anchoring member changes position from one housing to the adjacent housing, such an embodiment can be used as a manufacturing aid, to determine optimal placement of an anchoring member for each user;

FIGS. 24 to 26 Flowcharts Representing Further Aspects

FIG. 24 shows a method for enhancing processing of visual information from a scene with a plurality of details, that includes steps 137, 138, 140, 142, 144, 146, and 148; steps 140, 142, 144, and 146 can be reordered, steps 140, 142, 144, and 146 can be repeated to optimize operation, some aspects of the method can be used to ameliorate conditions related to poor visual function, some aspects of the method can be used to ameliorate conditions related to poor visual processing, some aspects can be used to ameliorate conditions related to poor connection between left hemisphere 30 and right hemisphere 68 of a brain 70, some aspects can be used to improve connection between left hemisphere 30 and right hemisphere 68 of brain 70, some aspects of the method can be used as therapy, in some embodiments, steps can be added to this method;

FIG. 25 shows a method for diagnosing a visual processing disorder that includes steps 168, 170, 172, 176, 178, 180, 182, and 184; steps 168 and 170 can be taken after steps 172, 176, 178, and 180; in steps 170, 180, and 182 reading skill can be accuracy, fluency, or comprehension, accuracy can be a percentage of words that a user reads correctly or another suitable gauge, fluency can be a rate at which a user reads, in words per minute, or another suitable gauge, comprehension could be measured by the number of questions that a user gets right on a test, other assessments of reading skill can be used, steps can be added to the method;

FIG. 26 shows a flowchart of a method for producing a visual processing aid that includes steps 190, 192, and 194; steps 190 and 192 can be reordered, steps 190, 192, and 194 can be repeated, steps 192 and 194 can be omitted, in some embodiments, steps can be added to the method.

As used herein, and unless otherwise specified, the term "transparent" means allowing light to pass through so that objects can be distinctly seen; an alternative meaning may include "translucent" or shaded to mean that the clarity remains unaltered or dulled, but the "brightness", "tone", "luminance", "luminosity", and or "lightness" may be altered; the term "text" can be taken to mean "text and/or letters and/or words and/or numbers and/or symbols and/or objects and/or part of a scene and/or an entire scene and/or multiple scenes;" the term "scene" can be taken to mean "anything that is being viewed;" the term "detail" can be taken to mean "small element" for example in a piece of text the details may be phrases or words or letters; the terms "information" or "visual information" can be taken to mean "light energy" and/or "nerve impulses" and/or "brain signals;" the term "resolve" can be taken to mean "assimilate" and/or "put together accurately" and/or "understand;" the term "uniform change" should be taken to mean "steady change;" the term "line of sight" can be taken to mean "a line from the vicinity of the fovea of the user to the scene," unless the context clearly dictates otherwise. As used herein the terms "left" and "right" are from a wearer's point of view, unless the context clearly dictates otherwise.

As used herein, the term "or" is an inclusive "or" operator, and is equivalent to the term "and/or," unless the context clearly dictates otherwise; in addition, throughout the specification, the meaning of "a," "an," and "the" include plural references; the meaning of "in" includes "in" and "on."

Advantages

From the description above, a number of advantages of some embodiments of my visual processing aid become evident:
 (a) An anchoring member alters visual information so that users can assimilate visual information from left and right visual fields, and process visual information more accurately.
 (b) Vision will be clearer.
 (c) The brain will be able to invert an image more accurately and/or efficiently.
 (d) Letters, words, numbers, symbols, characters, objects and scenes will look stationary, look focused, and have distinct edges; they will be correctly orientated, and seen in a correct location.
 (e) Reading accuracy, fluency, and comprehension will be improved.
 (f) Users will be able to see a whole line of text at one instant.
 (g) Night vision and vision in poor light conditions will be improved; there will be less glare, fewer halos around light sources, and clearer night vision.
 (h) Users will be less sensitive to bright light.

Other Advantages

Some embodiments will ameliorate learning disabilities, including, dyslexia, dyspraxia, dyscalculia, attention deficit hyperactivity disorder, attention deficit disorder, oppositional defiant disorder, language processing difficulties, public speaking anxiety, speech disorders, obsessive compulsive disorder, Tourette Syndrome, conditions related to autism spectrum disorders, or Asperger syndrome. Some embodiments will improve focus, attention, or attention to detail. Some embodiments will improve conditions such as left-right confusion, inability to recognize faces, inability to understand facial expressions, or sensory overload. Further, some embodiments will ameliorate visual perception problems, including depth, color, hue, or shade perception.

Some embodiments will improve skills, including fine motor, gross motor, sensory integration, sports, musical, driving, navigation, machine operating, organizational, study, or academic skills. Some embodiments will improve balance and coordination.

Some embodiments will ameliorate motion sickness, vertigo, acrophobia, phobias related to vision, phobias related to information processing, exaggerated startle response, headaches, migraines, other one-sided headaches, eye strain, stimming, stress, anxiety, epilepsy, or schizophrenia. Some embodiments will improve processing of information, including but not limited to visual, auditory, tactile, taste, olfactory, proprioception, or kinesthetic information. Some embodiments will correct perceived spatial differences in visual information. Some embodiments will improve function of a brain or improve connection or processing between hemispheres of a brain.

Some embodiments will improve, stabilize, or slow, deterioration of vision, eye function, eye oscillatory movements, ocular motor system, optic nerve, visual pathway or brain. Some embodiments will ameliorate conditions caused by inadequate function of, or damage to, eyes, ocular motor system, optic nerve, visual pathway, or brain; including split brain syndrome, spatial orientation phenomenon, brain injury, concussion, neurological disorders, developmental delays, hemispherectomy, keratoconus or stroke.

Some embodiments will alleviate symptoms of other conditions, disease, disorder, deterioration or injury, including but not limited to, autoimmune disorders, high blood pressure, seizure disorders, esophagitis, gastritis, reflux, asthma, eczema, ear infections, respiratory infections, allergy disorder, neuro-ocular vestibular dysfunction, or problems within or caused by a vestibular system.

Some embodiments will alleviate symptoms of ophthalmic or neurological conditions, disease, disorder, deterioration or injury including, but not limited to, age-related macular degeneration, amblyopia, astigmatism, Behçet's disease, Bietti's crystalline dystrophy, blepharospasm, cataracts, color blindness, convergence insufficiency, diabetic retinopathy, floaters, glaucoma, idiopathic intracranial hypertension, low vision, macular edema, macular hole, macular pucker, refractive errors, retinal detachment, retinitis pigmentosa, Stargardt disease, Usher syndrome, uveitis or vitreous detachment.

Some embodiments will ameliorate other conditions caused by inadequate connection between two hemispheres of a brain, or inadequate function of one hemisphere of a brain, or dominance of one hemisphere over another.

Some embodiments will be used for screening, customization, calibration, measurement, analysis, recovery, improvement, or monitoring of conditions or function of an eye, ocular motor system, optic nerve, visual pathway, brain, vision, or visual processing. Some embodiments can be used in conjunction with other treatments.

Some embodiments can be used in humans or animals. Some embodiments will be more economical, portable, discrete, fast, accurate, easy to manufacture, or user friendly.

Conclusions, Ramification, and Scope

Accordingly, the reader will see that the visual processing aid and methods of the various embodiments can be used to read, and see, text, numbers, symbols and scenes easily and accurately. Furthermore, the visual processing aid and methods of the various embodiments have the additional advantages in that:

they allow a brain to assimilate visual information from left and right visual fields, and eliminate reversals, inversions, blurring, disappearing, and moving text;

they allow for increased reading speed, accuracy and comprehension;

they provide visual processing aids that are safe, discreet, neat, comfortable, light, convenient to use, relatively inexpensive, and easy to manufacture;

they provide a method of diagnosing dyslexia or a visual processing disorder cheaply, easily, accurately, and quickly;

they can be used to screen large numbers of students or patients for dyslexia or visual processing disorder, easily, quickly, accurately, and inexpensively;

they will prevent students with dyslexia or visual processing disorder from remaining undiagnosed.

Alternative Embodiments—Housing

Although the description above contains many specificities, these should not be construed as limiting the scope of the embodiments but as merely providing illustrations of some of several embodiments.

For example, in some embodiments, the housing can be eliminated or duplicated; the housing can have other shapes, size, color, tint, or material; the housing can be a void; the housing can be made integrally or separately; the housing can be formed by shaping techniques, such as, but not limited to, cutting, molding, casting, extrusion, crimping, molding, pressing, curing, heating, injection, machining, rolling, etcetera.

In other embodiments, the housing can have a different mode or function of operation; the housing can be a viewing apparatus, such as, but not limited to a, lens, monocle, pair of goggles, visor, magnifying glass, helmet, heads up display, intraocular accessory, intracorneal accessory, bookmark, reading ruler, reading guide, word swatter, text viewer, image viewer, telescope, pair of binoculars, text isolating apparatus, window, windshield, mirror, etcetera; the housing can be a writing surface, such as, but not limited to, books, composition books, paper, posters, sentence strips, white boards, blackboards, smart boards, etcetera; the housing can be printed material, such as, but not limited to, books, magazines, newspapers, leaflets, posters, web pages, documents, flash cards, picture, etcetera; the housing can be a sign, such as, but not limited to a, road sign, place name sign, exit sign, direction sign, public safety sign, etcetera; the housing can be a container, such as, but not limited to a, tube, box, frame, etcetera.

In other embodiments, the housing can be a software application, such as, but not limited to, an application for reading, writing, texting, typing, calculating, processing data, displaying data, analyzing data, virtualizing reality, augmenting reality, placing a virtual anchoring member, displaying text, displaying narrow columns of text, scrolling text, etcetera; the housing can be a visual presentation, such as, but not limited to an animation, a film, a video game, etcetera; the housing can be a virtual or physical overlay for a screen that is part of a machine, such as, but not limited to a, television, telephone, computer, tablet, theatre projection apparatus, teleprompter, virtual reality device, augmented reality device, etcetera; the housing can move in a manner such as but not limited to sliding, rotating, scrolling etcetera.

In some embodiments, the housing can consist of materials, such as, but not limited to, stainless steel, metal, titanium, aluminum, plastic, acetate, wood, polycarbonate, CR-39, high-refractive-index polymer, air, vacuum, glass, aluminium oxynitride, glass, calcite, cellophane, foturan, fused quartz, cellulose acetate, ceramic, minerals, glassine, paper, polyethylene, polyethylene terephthalate, polylactic acid, polyvinyl butyral, etcetera; the housing can consist of materials with different opacity, such as transparent, opaque, or translucent; the housing can have regions of different opacities; the housing can be tinted; the housing can have regions of different tints; the housing can be made from material that has other optic property such as, but not limited to, mirrored, coated, refractive, etcetera.

Alternative Embodiments—Anchoring Member

In some embodiments, the anchoring member can have other shapes, size, color, tint, density, or material; the anchoring member can be a channel, tunnel, or ridge; the anchoring member can have an asymmetrical, sloping shape, such as, but not limited to a triangle, a ramp shape, two thin rectangles that meet at an acute angle, two thin rectangles that intersect at an acute angle, etcetera.

In other embodiments, the anchoring member can be wide enough to extend over at least two details in the scene; however, the anchoring member can be too small to extend over at least two details in the scene, but be attached to the housing so that it is held closer to the eye, and therefore appears to be extend over at least two details of the scene; the anchoring member can have any length great enough that it that it can appear to span over at least two details in the text; the anchoring member can be any width that the brain can detect; the anchoring member can be any depth that the brain can detect.

The anchoring member can be attached to the housing such that it can appear to span over a plurality of details in the scene, can be held proximal to a line of sight of the user, spans a transition between a left visual field and a right visual field of the user.

The anchoring member can be disposed with the display surface such that it can appear to span over a plurality of details in the scene, can be held proximal to a line of sight of the user, and spans a transition between a left visual field and a right visual field of the user.

In some embodiments, the anchoring member can have any uniform change in the value of a property, such as, but not limited to opacity, transparency, translucency, reflectivity, brightness, color, tint, shape, hue, orientation, thickness, width, height, depth, density, optical density, refractive index, polarization, wavelength, photo-sensitivity and electromagnetic and electrochromic and electro-optical and physical and chemical and electronic and biological and bacterial and state of matter, etcetera.

In some embodiments, the anchoring member can be asymmetrical about any axis that is orientated in any direction; the anchoring member can have a uniform change in the value of a property along an axis that is orientated in any direction.

In other embodiments, the anchoring member can be energy from the electromagnetic spectrum; the anchoring member can filters, alters, or blocks, energy from any part of the electromagnetic spectrum; the anchoring member can be virtual; the anchoring member can be configured to move in a manner such as but not limited to sliding, rotating, scrolling, etcetera; the anchoring member may be switched on, or off, with a controller, such as, but not limited, to sensor, electronic switch, voice controller, remote controller, random controller, computer software controller, physical controller, blink controller, or gaze controller, etcetera; the anchoring member can frequently adjust, if for example, text size increases the anchoring member may increase in size, if line spacing increases the anchoring member may increase in size, or the anchoring member may adjust position, etcetera; the anchoring member can be made integrally or separately.

Alternative Embodiments—Display Surface

In other embodiments, the display surface can have a different mode or function of operation; the display surface can be a viewing apparatus, such as, but not limited to a, lens, monocle, pair of goggles, visor, magnifying glass, helmet, heads up display, intraocular accessory, intracorneal accessory, bookmark, reading ruler, reading guide, word swatter, text viewer, image viewer, telescope, pair of binoculars, text isolating apparatus, etcetera; the display surface can be a writing surface, such as, but not limited to, books, composition books, paper, posters, sentence strips, white boards, blackboards, smart boards, etcetera; the display surface can be printed material, such as, but not limited to, books, magazines, newspapers, leaflets, posters, web pages, documents, flash cards, etcetera.

In other embodiments, the display surface can be a sign, such as, but not limited to a, road sign, place name sign, exit sign, direction sign, public safety sign, etcetera; the display surface can be a container, such as, but not limited to a, tube, box, frame, etcetera; the display surface can be an application, such as, but not limited to, an application for reading, writing, texting, typing, calculating, processing data, displaying data, analyzing data, virtualizing reality, augmenting reality, etcetera, that places a virtual anchoring member onto a screen that is part of a machine, such as, but not limited to, televisions, telephones, computers, tablets, theatre projection apparatus, teleprompters, virtual reality devices, augmented reality devices etcetera; the display surface can be a virtual or physical overlay for a screen that is part of a machine, such as, but not limited to a, television, telephone, computer, tablet, theatre projection apparatus, teleprompter, virtual reality device, augmented reality device, etcetera.

In some embodiments, the display surface can move in a manner such as but not limited to sliding, rotating, scrolling etcetera; the display surface can display text proximal to the anchoring member, for example, by displaying narrow columns of text, scrolling text, etcetera; the display surface can be a training tool, such as, but not limited to an animation, a film, a visual presentation, a training exercise, a training video game, a training game, etcetera; the display surface can be a visual presentation, such as, but not limited to an animation, a film, a video game, etcetera.

Alternative Embodiments—Other

In other embodiments, the anchoring member can be attached to the housing by a different technique; the anchoring member can be attached to the housing with components such as, but not limited to, wires, Wi-Fi connections, hinges, stickers, tape, pivots, sliders, magnets, clips, clings, lamination, fusing, printing, adhesion, painting, screen printing, heating, etching, engraving, molding, injecting, curing, boring, etcetera.

In other embodiments, the contrast between anchoring member and housing can be created with materials that have a plurality of different properties such as, but not limited to materials of different, opacity, transparency, density, color, tint, shape, focal length, refractive index, optical density, polarization, wavelength, composition, state of matter, photo sensitivity, electrochromic, electro-optical, electromagnetic properties, etcetera; the contrast between anchoring member and housing can be created by adding material such as but not limited to physical, chemical, electronic, biological, bacterial, etcetera.

Other embodiments may have components that can manipulate energy waves by directing, reflecting, refracting, bending them, such as, but not limited to, electro-optical elements, fiber optics, waveguides, cloaking devices, virtual reality devices, augmented reality devices, etcetera.

Some embodiments may have inbuilt or attachable accessories such as, but not limited to, screens, display units, sensors, connectors, controllers, speakers, and printers.

Some embodiments can be used in conjunction with other treatments for damage to or conditions of the eye, ocular motor system, optical nerve, visual pathways or brain. Other embodiments may be used in conjunction with imaging technologies such as, but not limited to, laser speckle imaging, laser doppler imaging, functional near red spectroscopy, or other imaging technologies to screen, asses, treat, customize, calibrate, measure, improve, monitor function of, monitor damage to, monitor conditions of, the eye, ocular motor system, optic nerve, visual pathway or brain.

Some embodiments may be used in conjunction with other technologies that block visual information from areas of the visual field, such as, but not limited to, eye patches, blinkers, or glasses that block peripheral vision, etcetera.

In some embodiments, the method for producing a visual processing aid can have steps added and/or repeated and/or removed. In some embodiments the technique for producing a visual processing aid can include diverse manufacturing methods, that would be known to those skilled in the art, such as, but not limited to, rolling, molding, fusing, shaping, enclosing, laminating, spraying, joining, dipping, cutting, grinding, polishing, molding, pouring over blocks of different material, cutting, etcetera.

Other embodiments can have addition to, alteration of, or removal of, part of the eye, such as, but not limited to, sections of the cornea, retina, rods, cones, or lens, to create an anchoring member.

In other embodiments, the visual processing aid can be customized for each user; the visual processing aid can have a real slider, electronic slider or virtual slider, or progressively changing anchoring members to determine an optimal configuration of a visual processing aid for a user; progressively changing anchoring members could be filmed or animated to determine an optimal configuration of a visual processing aid for a user; the visual processing aid can have elements with progressively changing anchoring members that can be integrated with ophthalmological devices, such an embodiment will be used to determine an optimal configuration of a visual processing aid for a user. Different exemplary embodiments can be combined, without departing from the scope of the exemplary embodiments, etcetera.

Thus, the scope of the embodiments should be determined by the appended claims and their legal equivalents, rather than by the examples given.

I claim:

1. A method for enhancing processing of visual information from a scene with a plurality of details, said method comprising:
   (a) selecting a housing with a longitudinal axis and an orthogonal axis, said housing includes a viewing zone, wherein said viewing zone is transparent, and said housing includes a frame, wherein said frame is configured as an eyeglass frame,
   (b) selecting an anchoring member with a uniform change in the value of a property, wherein said anchoring member includes one or more straight-line sloping branches, and wherein said anchoring member contrasts with said housing,
   (c) disposing said straight-line sloping branch so that it is configured to be positioned proximal to a line of sight of a user,
   (d) disposing said anchoring member so that it is configured to be positioned between a retina of a user and said scene,
   (e) disposing the anchoring member so that said one or more straight-line sloping branches extends into a left visual field and a right visual field of said user,
   (f) disposing said anchoring member so that said one or more straight-line sloping branches is oblique to said orthogonal axis and oblique to said longitudinal axis and extends substantially across the viewing zone, and
   (g) the user viewing the scene,
whereby the user is able to assimilate an image of the anchoring member from the plurality of parts of visual information and in doing so, assimilate an image of said scene.

2. A visual processing aid, comprising:
   (a) a housing with a longitudinal axis and an orthogonal axis, and
   (b) a frame, wherein said frame is configured as an eyeglass frame, and
   (c) a viewing zone, wherein said viewing zone is transparent, and
   (d) an anchoring member with a predetermined, uniform change in the value of a property, wherein said anchoring member includes one or more straight-line sloping branches and wherein said anchoring member contrasts with said housing, and
   (e) a means for attaching said anchoring member to said housing wherein said anchoring member is configured to be positioned between a retina of a user and a scene, wherein the anchoring member is asymmetrical about at least one axis, and is attached to the housing wherein said one or more straight-line sloping branches is oblique to said orthogonal axis and oblique to said longitudinal axis and extends into a left visual field and a right visual field, and wherein said one or more straight-line sloping branches extends substantially across the viewing zone and is configured to be positioned proximal to a line of sight of a user.

3. The visual processing aid of claim 2, wherein said housing further includes a void.

4. The visual processing aid of claim 2, wherein said one or more straight-line sloping branches have any colors.

5. The visual processing aid of claim 2, wherein said housing has regions of different opacities.

6. A visual processing aid, comprising,
   (a) a housing with a longitudinal axis and an orthogonal axis, and (b) at least one lens, and
(c) a viewing zone, wherein said viewing zone is transparent,
(d) an anchoring member with a predetermined, uniform change in the value of a property, wherein said anchoring member includes one or more straight-line sloping branches and wherein said anchoring member contrasts with said housing, and
(e) a means for attaching said anchoring member to said housing wherein said anchoring member is configured to be positioned between a retina of a user and a scene, wherein the anchoring member is asymmetrical about at least one axis, and is attached to the housing wherein said one or more straight-line sloping branches is oblique to said orthogonal axis and oblique to said longitudinal axis and extends into a left visual field and a right visual field, and wherein said one or more straight-line sloping branches extends substantially across the viewing zone and is configured to be positioned proximal to a line of sight of a user.

7. The visual processing aid of claim 6, wherein said anchoring member matches a curved face of said at least one lens.

8. The visual processing aid of claim 6, wherein said anchoring member extends to an extreme of said at least one lens, and thereof matches the shape of said at least one lens.

9. The visual processing aid of claim 6, wherein said housing includes a configuration to generate said anchoring member, wherein said configuration includes a power unit, a light source, and a controller; wherein said anchoring member can be altered with said controller.

10. The visual processing aid of claim 6, wherein said at least one lens is a contact lens.

11. The visual processing aid of claim 6, wherein said at least one lens is an intraocular lens.

12. A visual processing aid, comprising:
(a) a housing, with a longitudinal axis and an orthogonal axis, wherein said housing is configured as a viewing tube, and
(b) a viewing zone wherein said viewing zone is transparent,
(c) an anchoring member with a predetermined, uniform change in the value of a property, wherein said anchoring member includes one or more straight-line sloping branches and wherein said anchoring member contrasts with said housing, and
(d) a means for attaching said anchoring member to said housing wherein said anchoring member is configured to be positioned between a retina of a user and a scene, wherein the anchoring member is asymmetrical about at least one axis, and is attached to the housing wherein said one or more straight-line sloping branches is oblique to said orthogonal axis and oblique to said longitudinal axis and extends into a left visual field and a right visual field, and wherein said one or more straight-line sloping branches extends substantially across the viewing zone and is configured to be positioned proximal to a line of sight of a user.

* * * * *